(12) United States Patent
Huang et al.

(10) Patent No.: US 11,108,488 B2
(45) Date of Patent: Aug. 31, 2021

(54) OPTICAL TRANSCEIVER AND METHOD OF CONTROLLING OPTICAL POWERS OF OPTICAL CHANNELS

(71) Applicant: Telefonaktiebolaget LM Ericsson (publ), Stockholm (SE)

(72) Inventors: Wei-Ping Huang, Stockholm (SE); Francesco Testa, Pomezia Roma (IT); Gemma Vall-Llosera, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/804,135

(22) Filed: Feb. 28, 2020

(65) Prior Publication Data

US 2020/0204284 A1 Jun. 25, 2020

Related U.S. Application Data

(62) Division of application No. 16/329,301, filed as application No. PCT/SE2016/050853 on Sep. 13, 2016, now Pat. No. 10,608,773.

(51) Int. Cl.
*H04B 10/564* (2013.01)
*H04J 14/02* (2006.01)
(Continued)

(52) U.S. Cl.
CPC .... *H04J 14/0201* (2013.01); *H04B 10/25752* (2013.01); *H04B 10/25755* (2013.01);
(Continued)

(58) Field of Classification Search
CPC .......... H04B 10/2504; H04B 10/25755; H04B 10/293; H04B 10/40; H04B 10/564;
(Continued)

(56) References Cited

U.S. PATENT DOCUMENTS 6,400,479 B1 * 6/2002 Zhou ................ H04B 10/07953
398/158
7,092,638 B2 * 8/2006 Funami ............... H04J 14/0221
398/140
(Continued)

FOREIGN PATENT DOCUMENTS

CN 102301627 A 12/2011
CN 102984604 A 3/2013
(Continued)

OTHER PUBLICATIONS

Chinese First Office Action dated Apr. 13, 2020 for Chinese Patent Application No. 201680089256.1, 12 pages.
(Continued)

*Primary Examiner* — Li Liu
(74) *Attorney, Agent, or Firm* — Sage Patent Group

(57) ABSTRACT

Systems and methods for controlling optical powers of optical channels in an optical communications network comprising a plurality of nodes is described herein. The method comprises obtaining a reference optical power. The method also includes determining an optical power of an optical channel generated by an optical transmitter of a node. The method further includes applying an attenuation to the optical channel to reduce the optical power of the optical channel to the reference optical power. In some implementations, the method is performed by a network controller operating in the optical communications network.

13 Claims, 11 Drawing Sheets

(51) Int. Cl.
*H04B 10/2575* (2013.01)
*H04B 10/293* (2013.01)
*H04B 10/25* (2013.01)
*H04B 10/40* (2013.01)

(52) U.S. Cl.
CPC ..... *H04B 10/25891* (2020.05); *H04B 10/293* (2013.01); *H04B 10/40* (2013.01); *H04B 10/564* (2013.01); *H04J 14/021* (2013.01); *H04J 14/0202* (2013.01); *H04J 14/0221* (2013.01); *H04J 14/0283* (2013.01)

(58) Field of Classification Search
CPC .. H04J 14/0201; H04J 14/0202; H04J 14/021; H04J 14/0221
USPC ................. 398/38, 59, 67, 83, 115–117, 197
See application file for complete search history.

(56) References Cited

U.S. PATENT DOCUMENTS

| | | | | |
|---|---|---|---|---|
| 2002/0101636 | A1* | 8/2002 | Xiao | G02B 6/29362 398/83 |
| 2004/0109686 | A1* | 6/2004 | Shi | H04J 14/0205 398/41 |
| 2008/0273876 | A1* | 11/2008 | Lundquist | H04B 10/296 398/59 |
| 2010/0150563 | A1* | 6/2010 | Nakajima | H04J 14/0213 398/81 |
| 2012/0321300 | A1* | 12/2012 | Sueoka | H04B 10/07955 398/34 |
| 2013/0058647 | A1* | 3/2013 | Boertjes | H04B 10/0775 398/38 |
| 2013/0251365 | A1* | 9/2013 | Sone | H04J 14/0221 398/38 |
| 2016/0028503 | A1* | 1/2016 | Costantini | H04J 14/021 398/34 |
| 2016/0094305 | A1* | 3/2016 | Yamashita | H04B 10/07955 398/34 |
| 2017/0141870 | A1* | 5/2017 | Testa | H04J 14/0212 |

FOREIGN PATENT DOCUMENTS

| | | |
|---|---|---|
| EP | 1 439 646 A2 | 7/2004 |
| EP | 2753141 B1 | 2/2019 |
| WO | WO 02/33517 A2 | 4/2002 |
| WO | WO 2013/188592 A1 | 12/2013 |
| WO | WO 2015/032424 A1 | 3/2015 |
| WO | WO 2015/176764 A1 | 11/2015 |

OTHER PUBLICATIONS

International Search Report and Written Opinion of the International Searching Authority for PCT International Application No. PCT/SE2016/050853 dated Jul. 11, 2017.
CPRI Specification V7.0, "Common Public Radio Interface (CPRI); Interface Specification," 128 pages, Oct. 9, 2015.
SFF Committee, "Diagnostic Monitoring Interface for Optical Transceivers," SFF-8472, Rev 12.2, 42 pages, Nov. 21, 2014.

* cited by examiner

OPTICAL TRANSCEIVER AND METHOD OF CONTROLLING OPTICAL POWERS OF OPTICAL CHANNELS

CROSS REFERENCE TO RELATED APPLICATION

This application is a divisional of U.S. patent application Ser. No. 16/329,301, filed on Feb. 28, 2019, which is a 35 U.S.C. § 371 national stage application of PCT International Application No. PCT/SE2016/050853, filed on Sep. 13, 2016, the disclosure and content of which is incorporated by reference herein in its entirety.

TECHNICAL FIELD

The invention relates to an optical transceiver and to a radio base station, RBS, node comprising the optical transceiver. The invention further relates to a radio base station, RBS, an optical communications network and a method of controlling optical powers of optical channels in an optical communications network.

BACKGROUND

The cellular architecture that is widely used by conventional mobile communication networks may include four basic elements for end-to-end, E2E, data transport and managed communication: the user equipment, UE, the radio access network, RAN, the core network, CN, and the operation, administration and maintenance, OAM, system. Currently deployed global system for mobile communication, GSM, wideband code-division multiple access, WCDMA, and universal mobile telecommunications system, UMTS, the so-called the 2nd generation, 2G, and the 3rd generation, 3G, mobile communication networks, conventionally use RANs comprising two geographically separated sites: radio base stations, RBS; and RBS controllers, for example a base station controller BSC and a radio network controller, RNC. After launching the 4th generation, 4G, long term evolution, LTE, mobile network, two separated sites belonging the 2G and 3G legacy RAN have been merged into a single site, the eNode B, eNB, comprising 2 sub-sites: a sub-site with baseband units, BBU, and a sub-site with the radio units, RU.

Various types of topologies for the field deployment of fronthaul optical network over legacy 2G/3G/4G networks have been recommended in the common public radio interface, CPRI, specification. One popular topology is the main-remote topology which has a star-network layout in which a BBU is remotely connected to a number of remote radio units, RRU, with a typical link distance of between a few hundred meters and 2 km. The link paths between the BBU and the RRUs are known as CPRI links. Conventionally, point-to-point, P2P, of single mode fibre, SMF, based duplex or simplex connections have been used by CPRI links. The frequency bands used by RU/RRU are usually below 3 GHz, which may enable implementation of flexible bandwidths from a few hundred KHz up to 20 MHz. With the use of arrayed antennas, for example a 4×4 antenna array, a data transmission rate of up to of 300 Mbit/s can be achieved between RRUs and UEs. To be able to support multiple RRUs with a flexible combination of different bandwidths for field deployment of RBSs, a system bandwidth of 100 MHz-200 MHz is commonly used to design legacy BBUs.

With the rapid growth of mobile communications in recent years, mobile communication systems are now required to support much larger system capacities with higher data rates over large coverage areas in a high-mobility environment. To satisfy such demands, a 5th generation mobile network, 5G, has been recently proposed. One of the basic requirements for the 5G network being outlined by the standardization bodies is that the 5G network shall deliver various types of services to UEs with ultrahigh peak data rates, e.g. tens of Gbit/s peak data rates for both uplink and downlink transmissions.

In order to achieve the desired ultrahigh peak data rates, a high-degree arrayed antenna system, for example 8×8 or 16×16 antenna arrays, and a 5G-Radio with ultra-wide system bandwidth, e.g. over 1 GHz, may be used. This is because the peak transmission data rate increases with increasing the system bandwidth as well as the number of arrayed antennas. To be able to design a compact 5G-Radio, it is desired to directly integrate arrayed antenna system into the 5G-Radio. Since the size of the antenna element decreases with increasing operating frequency, the 5G-Radio may be designed to be operated at the high frequency bands, for example 28 GHz.

Alternatively, the CPRI line bit rate of 10 Gbit/s with system bandwidth of 100-200 MHz conventionally designed for 2G/3G/4G-enabled legacy BBUs may be adapted for 5G-enabled BBUs, particularly during early stage field development of 5G-Radios that need to be integrated into the legacy 2G/3G/4G radio networks. Therefore, in order to satisfy the ultra-wide bandwidth of 5G-Radio, a number of BBUs designed for the legacy LTE, 4G, network may be used to provide bandwidth aggregation to implement the 5G-Radio. Taking 800 MHz bandwidth 5G-Radio as an example, one may make use of eight 100 MHz LTE-BBUs or four 200 MHz LTE-BBUs to implement bandwidth aggregation in order to provide 800 MHz bandwidth for 5G-radio.

One of challenges for the field deployment of the 5G-Radio network is the mismatch in optical distribution network, ODN, topology between the legacy 2G/3G/4G and the new 5G networks. In contrast to a conventional BBU-centralized star topology used by CPRI transport within 2G/3G/4G sites, the 5G-Radio now becomes the centralized point in the star topology where a single 5G-Radio has to be connected to a number of BBUs for CPRI transport. One of major problems to deploy a 5G-Radio network over and/or on top of legacy 2G/3G/4G networks is the significant increase of number of fibres, which could be up to a factor of 10 or more. For example, consider an 8 transmitter/receiver duplex-SMF interfaced transceiver is designed for 5G-Radio, and for the sake of bandwidth aggregation, a 5G-Radio centralized star topology is used to cross-connect a 5G-Radio with a cluster of four BBUs. With the most simple site configuration of 3-sectors and a single branch, 48 SMFs will be needed in order to support data steam transport over CPRI links for three 5G-Radios, which is a factor of 8 increase in the number of fibres compared to a similar 3-sector site with 6 SMFs in 2G/3G/4G cases. Such a drastic increase in the of number fibres for a single site is not acceptable by mobile operators due to the extreme high cost of the fibre roll-out and/or the cost of leased fibres in the existing 2G/3G/4G radio networks.

One of well-known methods to reduce the number of fibres is to make the use of dense wavelength division multiplexing, DWDM, technologies. Using DWDM, it is possible to reduce a large number of SMFs down to a single SMF. DWDM technologies also enable the deployment of cascaded-chain and/or ring network topologies for fronthaul optical networks, with transport link protection. Unfortunately, the commercial available off-the-shelf key components used by DWDM technologies, for example, transponders, arrayed waveguide gratings, AWG, wavelength selective switches, WSS, erbium-doped fibre amplifiers, EDFA, etc., are very expensive. This is because these components are usually designed to satisfy highly demanding requirements in terms of providing high link budget, high thermal stability and high flexibility for channel-plans with the possibility of specific band-bypass/band-filtering etc. and are designed for long-haul transport networks.

SUMMARY

It is an object to provide an improved optical transceiver. It is a further object to provide an improved radio base station, RBS, node. It is a further object to provide an improved radio base station, RBS. It is a further object to provide an improved optical communications network. It is a further object to provide an improved method of controlling optical powers of optical channels in an optical communications network.

A first aspect of the invention provides an optical transceiver comprising an optical waveguide, a first add-drop port, a second add-drop port, an optical transmitter and an optical receiver. The first add-drop port is at a first end of the optical waveguide and the second add-drop port is at a second end of the optical waveguide. The optical transmitter is operable to generate an optical channel at a respective wavelength. The optical transmitter is coupled to a reconfigurable optical channel-add apparatus. The reconfigurable optical channel-add apparatus comprises a first optical add path including a first optical attenuator, a second optical add path including a second optical attenuator, and an add micro-ring resonator. The first optical attenuator and the second optical attenuator are reconfigurable to selectively block an optical channel from the optical transmitter in one of the first optical add path and the second optical add path. The add micro-ring resonator is reconfigurable selectively to add an optical channel from the first optical add path to the optical waveguide to travel towards the first add-drop port or to add an optical channel from the second optical add path to the optical waveguide to travel towards the second add-drop port. The optical receiver is coupled to a reconfigurable optical channel-drop apparatus. The reconfigurable optical channel-drop apparatus comprises a drop micro-ring resonator, a first drop path, and a second drop path. The drop micro-ring resonator is reconfigurable selectively to drop an optical channel travelling from the first add-drop port from the optical waveguide to the first drop path or to drop an optical channel travelling from the second add-drop port from the optical waveguide to the second drop path.

This structure may enable reconfiguration of the optical transceiver between a working mode and a protection mode, which may enable a protection mechanism to be implemented in an RBS and in an optical communications network, as described below. The optical transceiver therefore has a built-in switching functionality and can thus be used for the deployment of link protection mechanisms. A transceiver having an embedded ROADM is therefore provided which may enable the construction of DWDM-enabled transport solutions for fronthaul optical networks with low energy consumption, low-cost and small footprint.

In an embodiment, the first optical attenuator and the second optical attenuator are reconfigurable between a first state in which an optical channel from the optical transmitter is blocked in the first optical add path and a second state in which an optical channel from the optical transmitter is blocked in the second optical add path. The add micro-ring resonator is reconfigurable between a first state in which the add micro-ring resonator is configured to add an optical channel from the second optical add path to the optical waveguide to travel towards the second add-drop port and a second state in which the add micro-ring resonator is configured to add an optical channel from the first optical add path to the optical waveguide to travel towards the first add-drop port. The drop micro-ring resonator is reconfigurable between a first state in which the drop micro-ring resonator is configured to drop an optical channel travelling from the second add-drop port from the optical waveguide to the second drop path and a second state in which the drop micro-ring resonator is configured to drop an optical channel travelling from the first add-drop port from the optical waveguide to the first drop path. The optical transceiver additionally comprises a controller configured to receive a second control signal and to cause the first optical attenuator and the second optical attenuator, the add micro-ring resonator and the drop micro-ring resonator to switch between the first state and the second state in dependence on the second control signal. This structure may enable reconfiguration of the optical transceiver between a working mode and a protection mode, which may enable a protection mechanism to be implemented in an optical communications network, as described below.

The controller could be implemented as one or more processors, hardware, processing hardware or circuitry.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

In an embodiment, the optical transceiver comprises a plurality of optical transmitters, a plurality of reconfigurable optical channel-add apparatus, and a plurality of optical receivers. Each optical transmitter is operable to generate a respective optical channel at a respective one of a plurality of wavelengths. Each optical transmitter is coupled to a respective reconfigurable optical channel-add apparatus. Each optical receivers is coupled to a respective one of the plurality of reconfigurable optical channel-drop apparatus.

A multi-wavelength optical transceiver is therefore provided. By coupling each transmitter to a micro-ring resonator based reconfigurable optical channel-add apparatus and each receiver to a micro-ring resonator reconfigurable optical channel-drop apparatus, the multi-wavelength optical transceiver requires only a single optical transmitter for each optical channel, a single optical receiver for each optical channel, and a single optical waveguide bus. This structure may enable reconfiguration of the optical transceiver between a working mode and a protection mode, which may enable a protection mechanism to be implemented in an RBS and in an optical communications network, as described below. This structure may also reduce the number of transmitters, receivers and connectors required by the transceiver and simplify the structure of the transceiver, allowing it to have a smaller size. A multi-wavelength transceiver having an embedded ROADM is therefore provided which may enable the construction of DWDM-enabled transport solutions for fronthaul optical networks with low energy consumption, low-cost and small footprint, having a reduction by a factor of 5 or more compared to the transport solutions with conventional DWDM devices.

In an embodiment, the first optical attenuator and the second optical attenuator of each reconfigurable optical channel-add apparatus are additionally reconfigurable to apply an optical attenuation to an optical channel in the other of the first add path and the second add path. This may enable regulation of the optical power for each of the optical channels so that when the optical transmitter is implemented in an RBS node within a FrON, crosstalk between adjacent channels in the FrON may be diminished. Unbalanced incoming optical powers in DWDM-based FrON, which may be generated for different DWDM channels during their propagation over the DWDM link paths, may therefore be reduced. This may also reduce degradation of signal quality signal extraction and analysis, which a significant difference in optical powers can cause due to poor resolution caused by the superposition of signals for adjacent channels.

In an embodiment, the optical transceiver additionally comprises optical attenuator control apparatus configured to generate a first control signal comprising an indication of respective optical attenuations to be applied in the optical channel-add apparatuses. Each optical attenuation depends on an optical power of the optical channel generated by the respective optical transmitter and depends on a reference optical power for the plurality of optical channels. This may enable static and/or dynamic regulation of the optical power for all the optical channels against a common reference, so that crosstalk between adjacent channels in a fronthaul optical network may be diminished. Dependence of the optical attenuation on a reference optical power may also enable the optical power of each of the optical channels to be adjusted such that it is the same as the other optical channels transmitted over the fronthaul optical network.

In an embodiment, each add micro-ring resonator is arranged such that an optical channel received from the first add path passes in a clockwise direction around at least a portion of the add micro-ring resonator, and an optical channel received from the second add path passes in an anticlockwise direction around at least a portion of the add micro-ring resonator. The optical transceiver therefore requires only a single optical transmitter for each optical channel, a single optical receiver for each optical channel, and a single optical waveguide bus. This structure may enable reconfiguration of the optical transceiver between a working mode and a protection mode, which may enable a protection mechanism to be implemented in an optical communications network, as described below.

In an embodiment, each reconfigurable optical channel-add apparatus additionally comprises an optical coupling apparatus having an input configured to receive an optical channel from the optical transmitter, a first output coupled to the first add path and a second output coupled to the second add path. An optical channel can therefore be provided from the respective optical transmitter to the same input, whether the optical is to be added from the first add-drop port or from the second add-drop port.

In an embodiment, the optical coupling apparatus comprises an optical power splitter configured to split the received optical channel into a first optical channel which is output from the first output and a second optical channel which is output from the second output.

In an embodiment, the first add path comprises a second optical waveguide and the second add path comprises a third, different optical waveguide.

In an embodiment, in each reconfigurable optical channel-drop apparatus the first drop path includes third optical attenuator and the second optical drop path includes a fourth optical attenuator. The third optical attenuator and the fourth optical attenuator are reconfigurable to selectively attenuate an optical channel received from the drop micro-ring resonator.

In an embodiment, each reconfigurable optical channel-drop apparatus additionally comprises an optical coupling apparatus having a first input configured to receive an optical channel from the first drop path and a second input configured to receive an optical channel from the second drop path and an output coupled to the optical receiver.

In an embodiment, the first drop path comprises a fourth optical waveguide and the second drop path comprises a fifth, different optical waveguide.

In an embodiment, the optical transceiver is implemented as a photonic integrated circuit, PIC, and may be implement as an integrated, single silicon photonic device. Providing a photonically enabled multi-λ DWDM TRX with an embedded ROADM may enable deployment of DWDM-enabled transport solutions for fronthaul optical networks with low energy consumption, low-cost and small footprint.

In an embodiment, the optical transceiver is packaged in one of a pluggable form factor and a board-mounted form factor.

Corresponding embodiments are also applicable to the radio base station, RBS, node, to the radio base station, RBS, and to the optical communications network described below.

A further aspect of the invention provides a radio base station, RBS, node comprising an optical transceiver comprising an optical waveguide, a first add-drop port, a second add-drop port, an optical transmitter and an optical receiver. The first add-drop port is at a first end of the optical waveguide and the second add-drop port is at a second end of the optical waveguide. The optical transmitter is operable to generate an optical channel at a respective wavelength. The optical transmitter is coupled to a reconfigurable optical channel-add apparatus. The reconfigurable optical channel-add apparatus comprises a first optical add path including a first optical attenuator, a second optical add path including a second optical attenuator, and an add micro-ring resonator. The first optical attenuator and the second optical attenuator are reconfigurable to selectively block an optical channel from the optical transmitter in one of the first optical add path and the second optical add path. The add micro-ring resonator is reconfigurable selectively to add an optical channel from the first optical add path to the optical waveguide to travel towards the first add-drop port or to add an optical channel from the second optical add path to the optical waveguide to travel towards the second add-drop port. The optical receiver is coupled to a reconfigurable optical channel-drop apparatus. The reconfigurable optical channel-drop apparatus comprises a drop micro-ring resonator, a first drop path, and a second drop path. The drop micro-ring resonator is reconfigurable selectively to drop an optical channel travelling from the first add-drop port from the optical waveguide to the first drop path or to drop an optical channel travelling from the second add-drop port from the optical waveguide to the second drop path.

The RBS node may enable the field deployment of 5G-Radios and baseband units, BBUs, over legacy radio access networks.

In an embodiment, the RBS node additionally comprises first control unit configured to generate the second control signal in response to receiving a protection control signal comprising an indication that reconfiguration is required between the working mode and the protection mode.

A further aspect of the invention provides a radio base station comprising a remote radio unit, RRU, comprising a first optical transceiver, a baseband unit, BBU, comprising a second optical transceiver, a first optical fibre link and a second optical fibre link. The first optical transceiver and the second optical transceiver each comprise an optical waveguide, a first add-drop port, a second add-drop port, an optical transmitter and an optical receiver. The first add-drop port is at a first end of the optical waveguide and the second add-drop port is at a second end of the optical waveguide. The optical transmitter is operable to generate an optical channel at a respective wavelength. The optical transmitter is coupled to a reconfigurable optical channel-add apparatus. The reconfigurable optical channel-add apparatus comprises a first optical add path including a first optical attenuator, a second optical add path including a second optical attenuator, and an add micro-ring resonator. The first optical attenuator and the second optical attenuator are reconfigurable to selectively block an optical channel from the optical transmitter in one of the first optical add path and the second optical add path. The add micro-ring resonator is reconfigurable selectively to add an optical channel from the first optical add path to the optical waveguide to travel towards the first add-drop port or to add an optical channel from the second optical add path to the optical waveguide to travel towards the second add-drop port. The optical receiver is coupled to a reconfigurable optical channel-drop apparatus. The reconfigurable optical channel-drop apparatus comprises a drop micro-ring resonator, a first drop path, and a second drop path. The drop micro-ring resonator is reconfigurable selectively to drop an optical channel travelling from the first add-drop port from the optical waveguide to the first drop path or to drop an optical channel travelling from the second add-drop port from the optical waveguide to the second drop path. The first optical fibre link and the second optical fibre link are each coupled between the RRU and the BBU. The optical transmitter of the first optical transceiver is operable to generate an optical channel at a first wavelength and the optical transmitter of the second optical transceiver is operable to generate an optical channel at a second wavelength, different to the first wavelength.

The RRU and BBU are therefore point-2-point connected by two redundant optical fibre links; one optical fibre link may form a working mode link and the other optical fibre link may form a protection mode link. The RBS may therefore implement a link protection mechanism by reconfiguring the optical transceivers. The optical transceiver having built-in switching functionality that can support two bi-directional wavelengths over one of two redundant optical fibre links, either the working link or the protecting link, can thus be used for the deployment of link protection mechanisms for point-2-point connected two node systems.

A further aspect of the invention provides an optical communications network comprising a bi-directional wavelength division multiplexing, WDM, ring interconnecting a plurality of first RBS nodes. At least one of the first RBS nodes is a baseband unit, BBU, and at least one other of the first RBS nodes is a remote radio unit, RRU. Each first RBS node comprises an optical transceiver comprising an optical waveguide, a first add-drop port, a second add-drop port, a plurality of optical transmitters and a plurality of optical receivers. The first add-drop port is at a first end of the optical waveguide and the second add-drop port is at a second end of the optical waveguide. Each optical transmitter is operable to generate a respective optical channel at a respective one of a plurality of wavelengths. Each optical transmitter is coupled to a respective reconfigurable optical channel-add apparatus. The reconfigurable optical channel-add apparatus comprises a first optical add path including a first optical attenuator, a second optical add path including a second optical attenuator, and an add micro-ring resonator. The first optical attenuator and the second optical attenuator are reconfigurable to selectively block an optical channel from the optical transmitter in one of the first optical add path and the second optical add path. The add micro-ring resonator is reconfigurable selectively to add an optical channel from the first optical add path to the optical waveguide to travel towards the first add-drop port or to add an optical channel from the second optical add path to the optical waveguide to travel towards the second add-drop port. Each optical receiver is coupled to a respective reconfigurable optical channel-drop apparatus. The reconfigurable optical channel-drop apparatus comprises a drop micro-ring resonator, a first drop path, and a second drop path. The drop micro-ring resonator is reconfigurable selectively to drop an optical channel travelling from the first add-drop port from the optical waveguide to the first drop path or to drop an optical channel travelling from the second add-drop port from the optical waveguide to the second drop path.

The communications network has an architecture which may enable the field integration of 5G-Radios into existing, legacy 2G/3G/4G-Radio networks. This may enable a smooth migration of legacy mobile networks to the next-generation of mobile networks, i.e. 5G mobile network and beyond. The communications network may support bandwidth de-aggregation conventionally configured between a single legacy BBU and a number of legacy RRUs but also support bandwidth aggregation between a 5G BBU-cluster and a single 5G-Radio. The communications network may significantly simplify the fibre-infrastructure for the field deployment and/integration of 5G-Radios into legacy 2G/3G/4G-Radio networks.

In an embodiment, the optical communications network additionally comprises a plurality of second RBS nodes connected to the WDM ring via a plurality of reconfigurable optical add drop multiplexers, ROADMs. Each second RBS node comprises a single-wavelength optical transceiver. At least one of the second RBS nodes is a baseband unit, BBU, and at least one other of the second RBS nodes is a remote radio unit, RRU.

In an embodiment, the WDM ring is a dense WDM, DWDM, ring.

In an embodiment, the first RBS nodes are nodes of a 5G radio network and the second RBS nodes are nodes of one of a 2G, 3G and 4G radio network. The network may provide a DWDM-ring based fronthaul optical network architecture/topology to support the field deployment of 5G-Radios into legacy 2G/3G/4G-Radio networks.

In an embodiment, the optical communications network additionally comprises a first control unit configured to obtain a reference optical power for the communications network and wherein the optical attenuator control apparatus in the first RBS nodes are configured to receive a third control signal comprising an indication of the reference optical power.

In an embodiment, the first control unit is configured to: obtain a transmission loss for each optical channel of each of the RBS nodes; identify the optical channel having the maximum transmission loss; and set the reference optical power equal to an optical power of the optical channel having the maximum transmission loss.

In an embodiment, the optical communications network additionally comprises a second control unit configured to provide a protection control signal in response to an indication that a fault has occurred in the optical communications network.

In an embodiment, the optical communications network additionally comprises an operations, administration and management, OAM, system configured to perform in-band OAM signalling with the first RBS nodes and configured to perform out-band OAM signalling with the second RBS nodes. The use of dedicated "in-band" and "out-band" OAM services to support the implementation static and dynamic processes for power regulation to diminish the unbalanced power induced crosstalk, which may significantly enhance the quality of signals during their propagation over the WDM ring network.

In an embodiment, the optical communications network is a fronthaul optical network of a radio access network, RAN. The communications network may enable a symmetrical layout of a fronthaul optical network with extended star-topologies for legacy RBS site & 5G RBS site over the WDM-Ring network.

Corresponding embodiments are also applicable to the method described below.

A further aspect of the invention provides a method of controlling optical powers of optical channels in an optical communications network comprising a plurality of nodes. The method comprises: obtaining a reference optical power; determining an optical power of an optical channel generated by an optical transmitter of a node; and applying an attenuation to the optical channel at the optical transmitter to reduce the optical power of the optical channel to the reference optical power.

This may enable static and/or dynamic regulation of the optical power for each of the optical channels generated at a node against a common reference so that crosstalk between adjacent channels in the network may be diminished. Dependence of the optical attenuation on a reference optical power may also enable the optical power of each of the optical channels generated at the node to be adjusted such that it is the same as other optical channels transmitted over the optical network. Unbalanced incoming optical powers in, for example, a DWDM-based optical network, which may be generated for different DWDM channels during their propagation over the DWDM link paths, may therefore be reduced. This may also reduce degradation of signal quality signal extraction and analysis, which a significant difference in optical powers can cause due to poor resolution caused by the superposition of signals for adjacent channels.

In an embodiment, the reference optical power is obtained by: obtaining a transmission loss for each optical channel of each of the nodes; identifying the optical channel having the maximum transmission loss; and setting the reference optical power equal to an optical power of the optical channel having the maximum transmission loss. This may enable static and/or dynamic regulation of the optical power for all the optical channels in an optical network against a common reference, so that crosstalk between adjacent channels may be diminished.

In an embodiment, the transmission loss is for each optical channel of each of the nodes a static transmission loss. The method may be applied for compensating static loss sources, for example adding and removing nodes in link paths of the WDM ring.

A further aspect of the invention provides a computer program, comprising instructions which, when executed on at least one processor, cause the at least one processor to perform any of the above steps of the method of controlling optical powers of optical channels in an optical communications network comprising a plurality of nodes.

A further aspect of the invention provides a data carrier having computer readable instructions embodied therein. The said computer readable instructions are for providing access to resources available on a processor. The computer readable instructions comprise instructions to cause the processor to perform any of the above steps of the method of controlling optical powers of optical channels in an optical communications network comprising a plurality of nodes.

In an embodiment, the carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
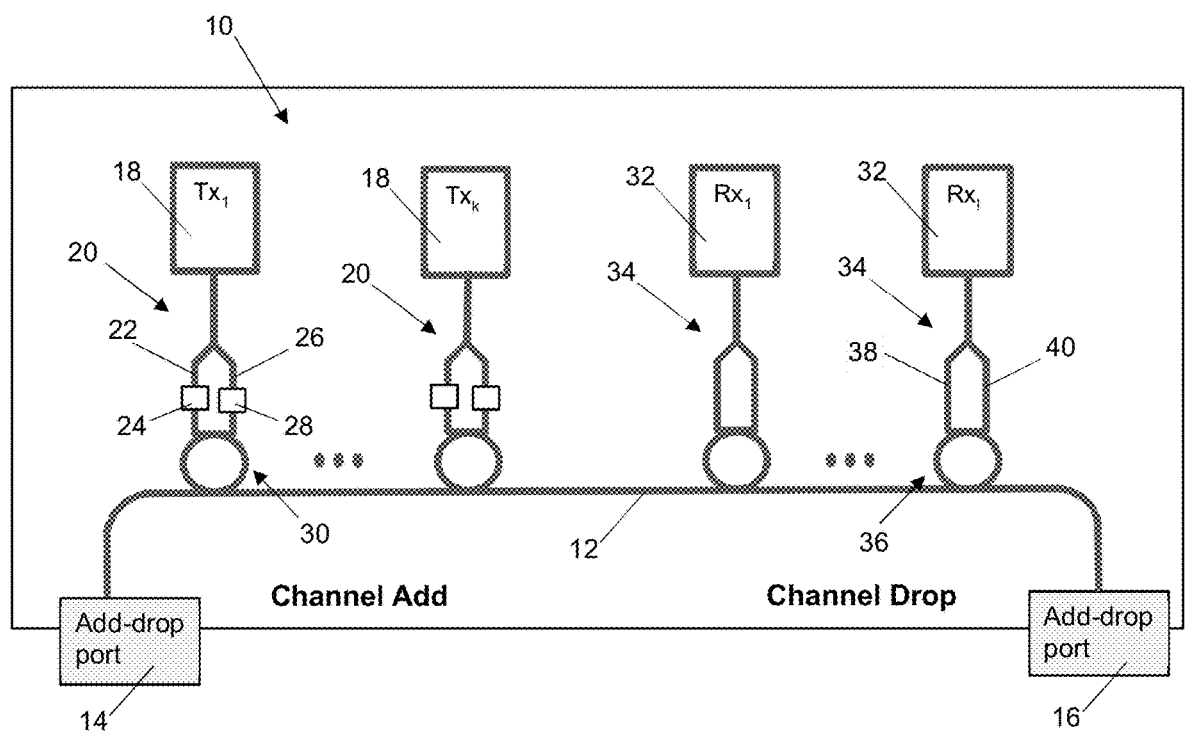
FIG. 1 illustrates an optical transceiver according to an embodiment of the invention.

Referring to FIG. 1, an embodiment of the invention provides an optical transceiver 10 comprising an optical waveguide 12, a first add-drop port 14 at a first end of the optical waveguide and a second add-drop port 16 at a second end of the optical waveguide. The optical transceiver additionally comprises a plurality of optical transmitters 18 and a plurality of optical receivers 32, such that the optical transceiver 10 is a multi-wavelength optical transceiver.

Each optical transmitter, Tx, is operable to generate a respective optical channel at a respective one of a plurality of wavelengths. Each optical transmitter is coupled to a respective reconfigurable optical channel-add apparatus 20. Each optical receiver, Rx, is coupled to a respective reconfigurable optical channel-drop apparatus 34.

Each reconfigurable optical channel-add apparatus 20 comprises a first optical add path 22 including a first optical attenuator 24, a second optical add path 26 including a second optical attenuator 28, and an add micro-ring resonator 30. The first optical attenuator and the second optical attenuator are reconfigurable to selectively block an optical channel from the optical transmitter in either the first optical add path or the second optical add path. The add micro-ring resonator is reconfigurable either to add an optical channel from the first optical add path to the optical waveguide to travel towards the first add-drop port or to add an optical channel from the second optical add path to the optical waveguide to travel towards the second add-drop port.

Each reconfigurable optical channel-drop apparatus 34 comprises a drop micro-ring resonator 36, a first drop path 38, and a second drop path 40. The drop micro-ring resonator is reconfigurable either to drop an optical channel travelling from the first add-drop port from the optical waveguide to the first drop path or to drop an optical channel travelling from the second add-drop port from the optical waveguide to the second drop path.

Figure 2:
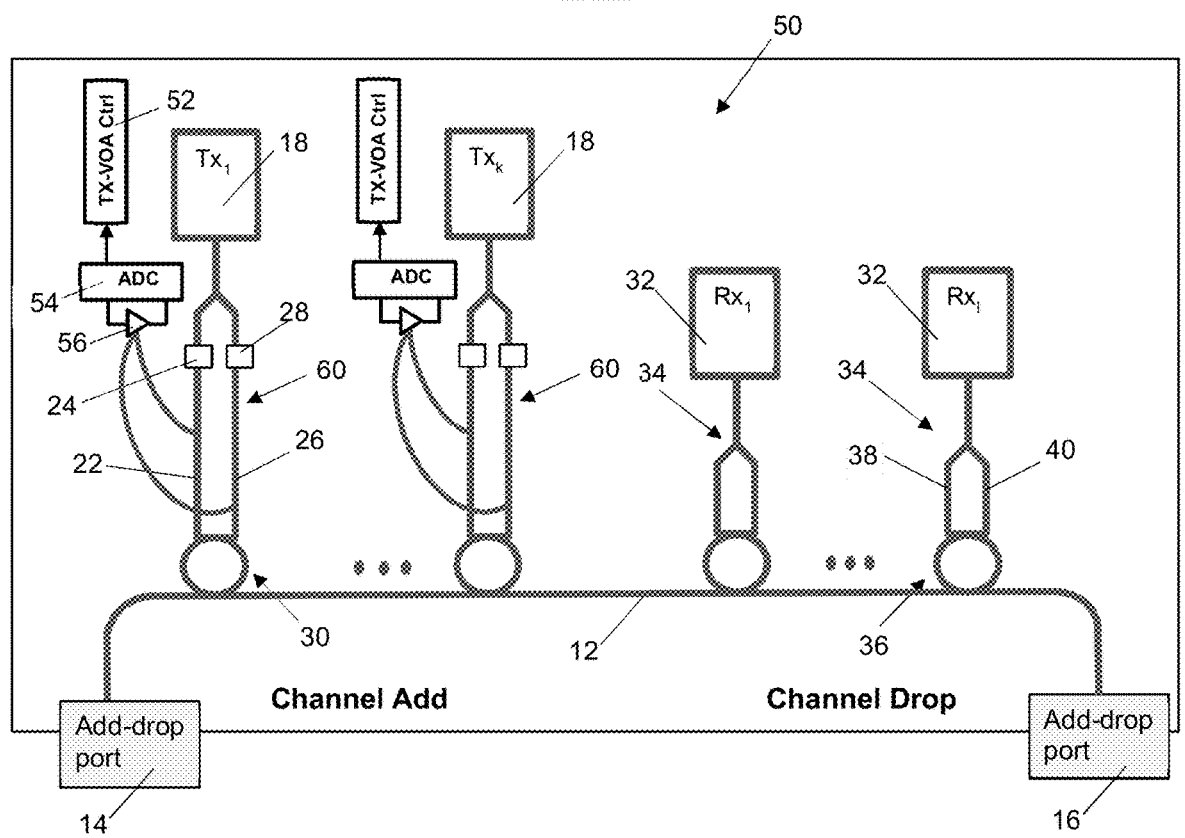
FIG. 2 illustrates an optical transceiver according to an embodiment of the invention.

In another embodiment, illustrated in FIG. 2, the first optical attenuator 24 and the second optical attenuator 28 of each reconfigurable optical channel-add apparatus 60 are additionally reconfigurable to apply an optical attenuation to an optical channel in the other of the first add path and the second add path.

In operation, if the first optical attenuator 24 is configured to block the optical channel propagating in the first optical add path, the second optical attenuator 28 will be configured to apply an optical attenuation to the optical channel propagating in the second optical add path. The first and second optical attenuators can then be reconfigured into the opposite arrangement, so the second optical attenuator 28 is configured to block the optical channel propagating in the second optical add path, the first optical attenuator 24 is configured to apply an optical attenuation to the optical channel propagating in the first optical add path. By configuring all of the reconfigurable optical channel-add apparatus in the same way, at any one time the optical transceiver can be reconfigured between a working mode and a protection mode.

In a further embodiment, each optical attenuator 24, 28 is a variable optical attenuator, VOA. The optical transceiver 50 additionally comprises optical attenuator control apparatus, TX-VOA Ctrl, 52 configured to generate a first control signal comprising an indication of respective optical attenuations to be applied by the VOAs in the optical channel-add apparatuses 60. Each optical attenuation depends on an optical power of the optical channel generated by the respective optical transmitter and depends on a reference optical power for the plurality of optical channels. The optical power of each optical channel may be obtained by tapping part of the optical channel after the VOA in each optical add-path and measuring the tapped signal at photo-detection apparatus comprising a photodiode 56 and an analogue-to-digital converter, ADC, 54.

In a further embodiment, each optical attenuator 24, 28, in each reconfigurable optical channel-add apparatus, is reconfigurable between a first state in which an optical channel from the optical transmitter is blocked in the first optical add path and a second state in which an optical channel from the optical transmitter is blocked in the second optical add path.

Each add micro-ring resonator 30 is reconfigurable between a first state in which the add micro-ring resonator is configured to add an optical channel from the second optical add path to the optical waveguide to travel towards the second add-drop port and a second state in which the add micro-ring resonator is configured to add an optical channel from the first optical add path to the optical waveguide to travel towards the first add-drop port Each drop micro-ring resonator 36 is reconfigurable between a first state in which the drop micro-ring resonator is configured to drop an optical channel travelling from the second add-drop port from the optical waveguide to the second drop path and a second state in which the drop micro-ring resonator is configured to drop an optical channel travelling from the first add-drop port from the optical waveguide to the first drop path.

In this embodiment, the optical transceiver 50 additionally comprises a controller (not illustrated) configured to receive a second control signal and, in dependence on the second control signal, to cause the first optical attenuator and the second optical attenuator of each reconfigurable optical channel-add apparatus, the add micro-ring resonators and the drop micro-ring resonators to switch between the first state and the second state.

A further embodiment of the invention provides an optical transceiver 100 as shown in FIG. 3, which again is a multi-wavelength optical transceiver and is substantially the same as the previous embodiment. The optical transceiver 100 of this embodiment is implemented as an integrated, single photonic integrated circuit, PIC.

Figure 3:
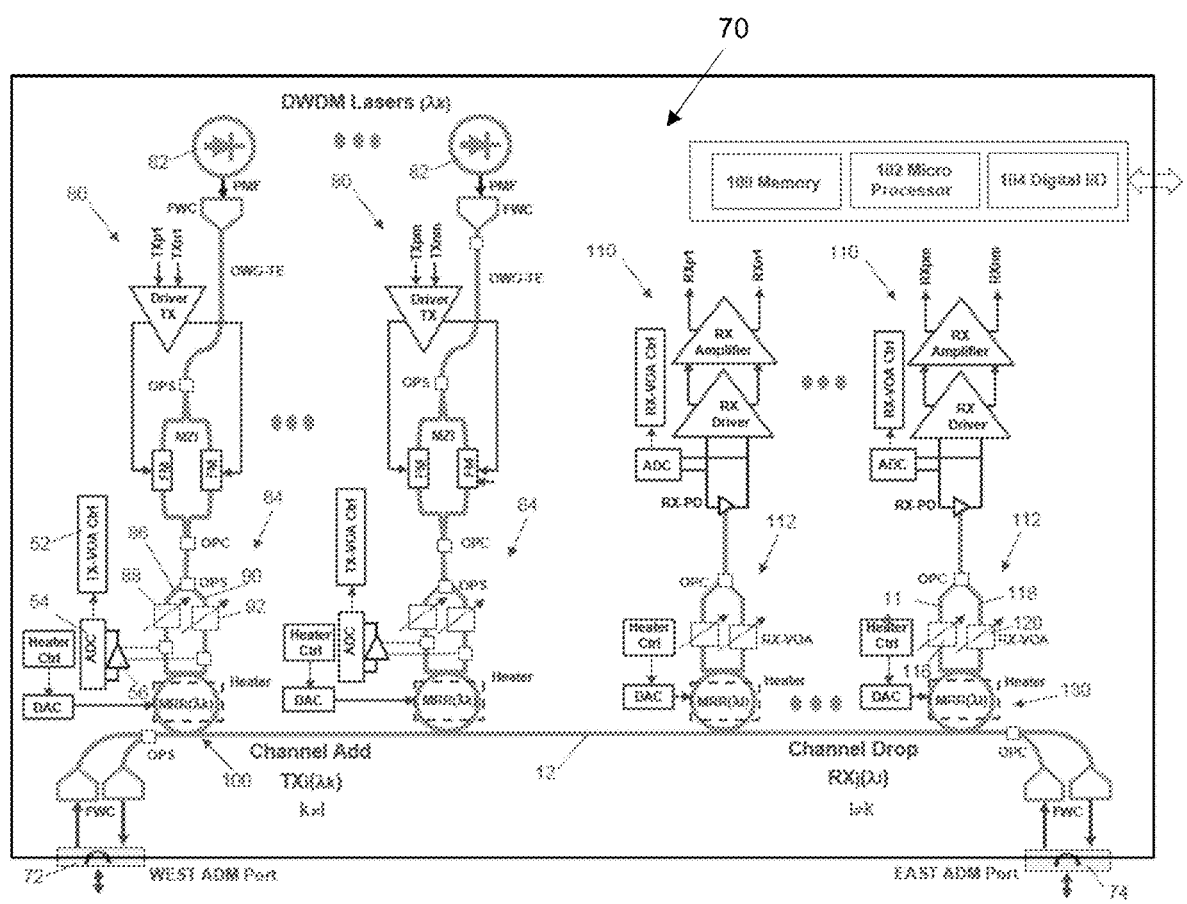
FIG. 3 illustrates an optical transceiver according to an embodiment of the invention.

FIG. 3 is a simplified bock diagram of the photonically enabled integrated circuit, PIC, of the multi-wavelength, multi-$\lambda$, optical transceiver 100. The PIC may use different types of generic platforms for the monolithic integration of various types of optoelectronic and microelectronic devices. The platform may be either a silicon photonic, SiP, based platform or an indium phosphide, InP, based platform, which may be fully compiled to the well-known manufacturing processes specified for complementary metal-oxide-semiconductor, CMOS. Various types of optoelectronic and microelectronic devices, may be either directly fabricated on semiconductor-on-insulator, SOI, wafer utilizing the CMOS processes or fabricated as external chipsets to be integrated onto the PIC utilizing the well-known flip-chip manufacturing processes. A hybrid SiP/InP multi-chip integrating platform may be used to fabricate the PIC if the optoelectronic and microelectronic devices are in compatible with the fabricating processes used by either a single SiP-based platform or a single InP-based platform.

The PIC multi-wavelength optical transceiver, TRX, 100 may be packaged in one of various well-known small form factor pluggable modules, such as CFP/CFP2/CFP4/CFP8/QSFP28 or may be designed as a board-mounted module using proprietary types of form factors for PIC packaging.

The multi-$\lambda$ DWDM TRX is equipped with multi-$\lambda$ DWDM transmitters TXi($\lambda$k) and multi-$\lambda$ receivers RXj($\lambda$l), where the indexes; i=1, 2, . . . , M and j=1, 2, . . . , N; are optical channel marks, which may be statically assigned to the transmitters and the receivers belonging to the multi-$\lambda$DWDM TRX, and the indexes; k=1, 2, . . . , m, l=1, 2, . . . , n and k≠l; are wavelength marks. For the transmitter channels, TXi(λk), the wavelengths λk may be statically assigned to the multi-λDWDM TRX according to a predefined channel-plan. For the receiver channels, RXj(λl), any of the channel wavelengths may be dynamically assigned to any of desired channels during channel-drop operations carried by the embedded ROADM. The wavelengths assigned to the transmitters must be different from those assigned to the receivers, and no wavelength re-use is possible.

The TXi(λk) 80 comprise: high power continuous wave, CW, lasers(λk) 82; fibre-to/from-waveguide couplers, FWC, that may be the grating type of coupler or the mode-field matching type of coupler for vertical or edge assembly of the fibre onto PIC; optical waveguides for transverse electric ground mode, OWG-TE; optical power splitters, OPS; optical signal modulators, OSM, which in this example are Mach-Zehnder interferometers, MZI, comprising a pair of phase modulators, PM; optical power combiners OPC; optical power taps, OPT.

The reconfigurable optical channel-add apparatus comprises a 2-directional reconfigurable optical channel-add multiplexer ROCAM, 2D-ROCAM, 84. The 2D-ROCAM 84 comprises: an optical power splitter, OPS; 2 OWG-TEs forming the first ('West') add path 86 and the second ('East') add path 90, including 2 built-in variable optical attenuators, TX-VOA, 88, 92 for transmitter power regulation; and an add micro-ring resonator, MRR(λk), 100.

The receivers, RXj(λl), 110 of the multi-λDWDM TRX 100 support dropping of channels or bypassing channels that are not to be dropped to the RXj(λl). Generally speaking, the RXj(λl) may have the same amount of channel number as that of TXi(λk).

Each RXj(λl) comprises a receiver photodiode, RX-PD, and is coupled to a reconfigurable optical channel-drop apparatus, which in this embodiment is a 2-directional reconfigurable optical channel-drop multiplexer ROCDM, 2D-ROCDM. The 2D-ROCDM comprises: an OPC; and two forming the first (West') drop path 114 and the second (East') drop path 118, including two variable optical attenuators, RX-VOA, 116, 120 for receiver power regulation; a drop micro-ring resonator 130, MRR(λl). The RX-PDs may be wideband devices that can cover an entire wavelength band, for example the C-band, so that the RX-PDs can support the selective drop of any desired wavelengths to any desired receiver channels RXj(λl) via the 2D-ROCDM 112.

The optical waveguide 12 is an OWG-TE connected at each end to two FWC to support channel-add operations on both the first ('West') add-drop multiplexer, ADM, port 72 and the second ('East') ADM port 74 respectively, and to support channel-drop operations on both the WEST ADM port and the EAST ADM port respectively.

Each ADM port 72, 74 is coupled to the respective FWCs via two SMFs. Each ADM port comprises a 3-way optical circulator which splits incoming traffic and/or combines outgoing traffic. Due the nature of circulator design, it can also reject any backward propagating signals to avoid recycling of dropped channels back out of the optical transceiver.

The transceiver 100 additionally comprises: TX electrical signal driver circuitry, TX-Driver; ADCs; TX-VOA digital control circuitry, TX-VOA Ctrl; RX electrical signal driver circuitry, RX-Driver; RX electrical signal amplifier circuitry, RX-Amplifier; RX-VOA digital control circuitry, RX-VOA Ctrl; heaters for controlling the add and drop micro-ring resonators, indicated by dashed line boxes; digital-to-analog converters, DAC; and digital control circuitry for the heaters, Heater-Ctrl. To enable communication with local and/or remote host systems, a built-in microprocessor, memory device and digital input-output, I/O, interface for the control and transport of digital signals are also provided in the PIC.

The CW lasers may be either the arrayed InP type of high power chip lasers that may be directly embedded into CMOS photonic die and/or an off-chip fibre-pigtailed distributed feedback, DFB, type of high power laser that may be designed as the flipped-attached devices integrated onto the PIC. The pigtailed fibre used by the DFB lasers may be polarization maintaining fibre, PMF. Because of strong built-in birefringence of PMF, the corresponding polarization status of laser beam in terms of the transverse electric, TE, mode propagated along the slow-axis and the transverse magnetic, TM, mode propagated along the fast-axis will be maintained. By carrying the pre-alignment between the polarization-axis of laser beam and the slow-axis of pigtailed PMF as well as between the slow-axis of pigtailed PMF to the axis of FWC during fabricating and/or packaging processes, the optical power of laser beam propagated inside the OGW-TE may be maximized.

The centre wavelengths of the CW lasers may be selected according to a proprietary channel-plan and/or a standardized channel-plan specified by standardization bodies, for example ITU-T G.694.1 06/2002, which belongs to one of the SMF transmission windows, e.g. C-band or L-band, etc.

The MZI enable modulation of incoming digital signals over the optical channel signals provided by the CW lasers 82, via the PM devices in the MZI arms. The optical signal provided by each individual CW laser is first coupled into the FWC through the PMF, and then guided into the OWG-TE. Since both the FWC and OWG-TE may be designed to only support the TE ground mode, the residual of high-order TE modes and/or TM modes shall be effectively filtered. Thus, the single TE ground mode is obtained. After passing through FWC, the optical signal propagates to the optical inputs of the two PMs of the MZI. Via the digital I/O circuit, the inputs of differential digital signals TXpi and TXni, where i=1, 2, . . . , m; p & n stand for the pin-out for positive and negative polarities; the digital signals from the host system shall be loaded on to the PIC and delivered to the TX-Driver for signal processing. The TX-Driver directs the processed signals into the electrical inputs of PMs for optical signal modulation. The modulated optical signals from the outputs of PMs are optically combined by the OPC. At the OPT a small portion of the optical signals are tapped off and guided to the Ctrl-PD 56. The remainder of the optical channel signal is transported to the 2D-ROCAM 84.

The components/devices belonging to 2D-ROCAM may be directly fabricated and embedded on the photonic die of the PIC. The incoming optical beam from the MZI is split into two link paths, i.e. the West Path and the East Path, and enters the two built-in photonic TX-VOAs respectively. According to the instructions given by TX-VOA Ctrl, the TX-VOA can apply any desired values of attenuation on the optical signals passing through it. Thus, the outgoing optical power can be turned down to any desired level. This enables the optical power for all outgoing channels TXi(λk) to be dynamically balanced, by actively monitoring and comparing the optical powers extracted by all Ctrl-PDs.

During the normal operation of the multi-λ TRX 100, outgoing optical channels may only be guided either on the WEST ADM Port or the EAST ADM Port. For example, if channels are to be added from the WEST ADM port, the maximum attenuation will be set by the right TX-VOA 92 on the "East" add path 90 to completely terminate the beam onto the EAST ADM port 74. Similarly, channels are to be added from the EAST ADM Port, the maximum attenuation will be set by the left TX-VOA 88 on the "WEST" add path 86, to completely terminate the beam onto the WEST ADM port. In order to effectively terminate unwanted channels, the TX-VOA is used as the outgoing beam terminators for the multi-λ TRX.

After passing through the TX-VOA, the MRR(λk) selectively directs either the optical channel from the west link path onto the outgoing path of WEST ADM port or the optical channel from the east link path onto the outgoing path of EAST ADM port. The specific channel-add operation for the MRR(λk) is done by applying a suitable current on the heater, which is controlled by Heater Ctrl via the high precise DAC. Furthermore, with the suitable combination of the four FWC and two OPS, it allows the bypass of optical channels that are not to be dropped by 2D-ROCDM on the EAST ADM port or the WEST ADM port. For example, if the incoming beam is on the WEST ADM Port, the beam will be directed onto the most left FWC through the duplex adapter where the beam will be split and guided into the 2D-ROCDM for the channel drop, the channels that are not dropped will be bypassed to the outgoing port of the EAST ADM port via the furthest right FWC. Similarly, if the incoming beam is on the EAST ADM port, besides the enabling of channel drop by the 2D-ROCDM, the channels that are not dropped will be bypassed and directed onto the WEST ADM port via the 2nd left FWC with the help the circulator 72 and the two input and output FWCs.

All of the components/devices belonging to the 2D-ROCDM may also be directly fabricated and embedded on the photonic die of the PIC. An externally incoming optical channel from a remote link partner TXj(λl) may enter the multi-λDWDM TRX 100 through either the EAST ADM port or the WEST ADM port. The incoming optical channels are guided by the OWG-TE that plays the role not only to carry the channels but also to filter unwanted the TM modes and the high order of TE modes from the incoming beams. The MRR(λl)s belonging to 2D-ROCDM can drop any desired optical channel from an incoming optical signal and direct them into a selected receiver RXj(λl), by applying suitable heat on drop micro-ring resonator heaters. The channels passing through MRR(λl)s are directed to the links either on the West Path or on the EAST path that has the built-in RX-VOAs, which are used to balance the optical power deposited on all RX-PDs.

Figure 4:
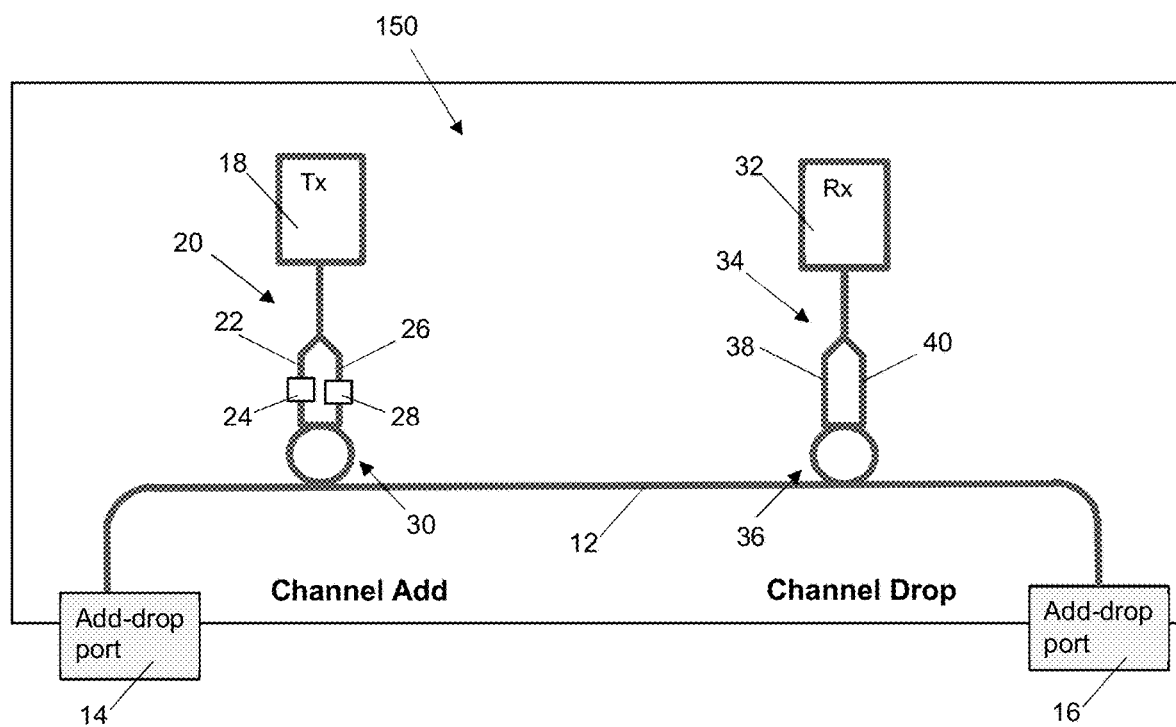
FIG. 4 illustrates an optical transceiver according to an embodiment of the invention.

FIG. 4 illustrates an optical transceiver 150 according to a further embodiment of the invention. The optical transceiver 150 of this embodiment is similar to the optical transceiver 10 described above with reference to FIG. 1, but the optical transceiver 150 of this embodiment comprises only a single optical transmitter 18, a single reconfigurable optical channel-add apparatus 20, a single optical receiver 32, and a single reconfigurable optical channel-drop apparatus 34. It will be understood therefore that the optical transceiver 150 is a single-λ optical transceiver.

Figure 5:
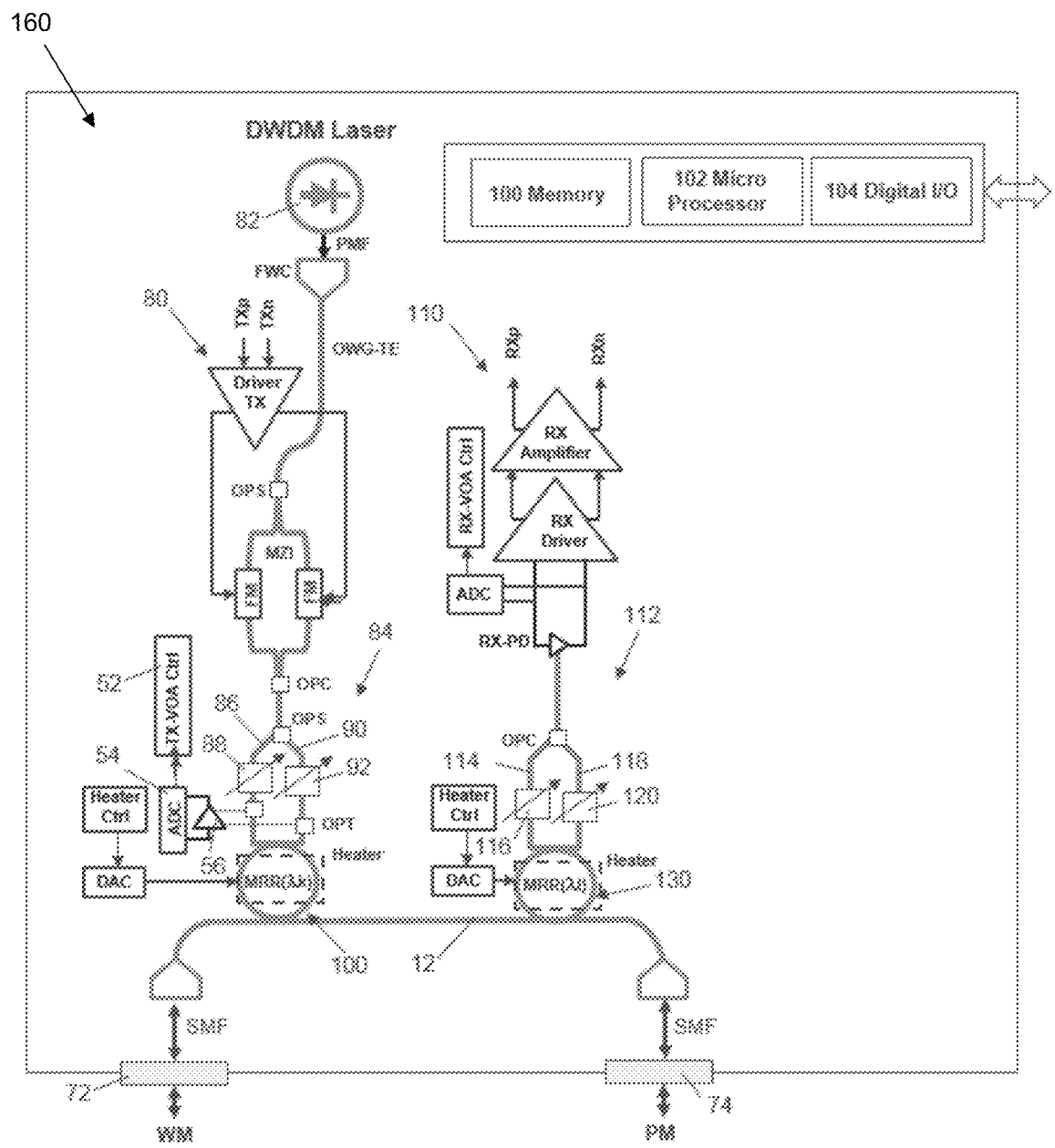
FIG. 5 illustrates an optical transceiver according to an embodiment of the invention.

A further embodiment of the invention provides an optical transceiver 160 as shown in FIG. 5, which again is a single-λ optical transceiver and is substantially the same as the previous embodiment. The optical transceiver 160 of this embodiment is implemented as an integrated, single photonic integrated circuit, PIC.

The optical transceiver 160 of this embodiment is similar to the optical transceiver 70 described above with reference to FIG. 3, but the optical transceiver 160 of this embodiment comprises only a single optical transmitter 82, a single reconfigurable optical channel-add apparatus 84, a single optical receiver 110, and a single reconfigurable optical channel-drop apparatus 112.

As with the multi-λ transceiver 70, the PIC single-λ optical transceiver, TRX, 160 may be packaged in one of various well-known small form factor pluggable modules, such as SFP/SFP+ or may be designed as a board-mounted module using proprietary types of form factors for PIC packaging.

Figure 6:
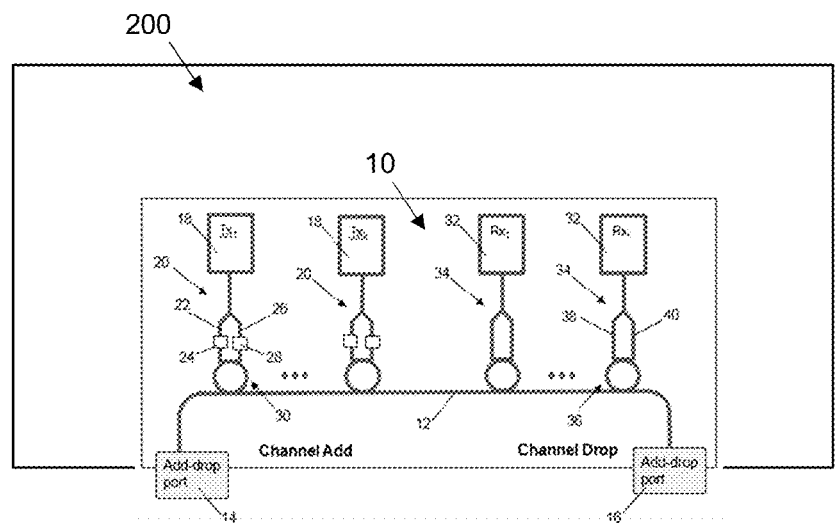
FIG. 6 illustrates a radio base station, RBS, node according to an embodiment of the invention.

An embodiment of the invention provides a radio base station, RBS, node 200 as illustrated in FIG. 6. The RBS node comprises a multi-wavelength optical transceiver 10, as described above. It will be appreciated that the RBS 200 may comprise any of the multi-wavelength optical transceivers 10, 50, 70 of FIGS. 1 to 3.

Figure 7:
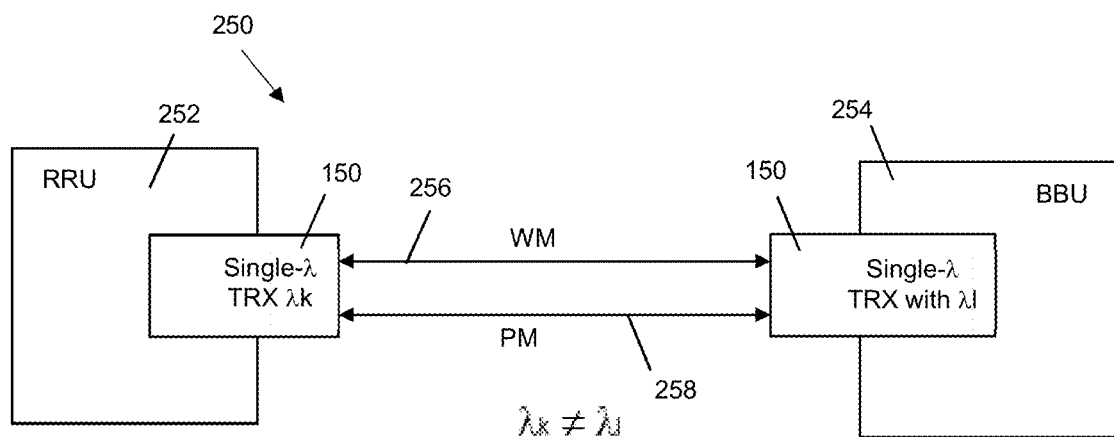
FIG. 7 illustrates a radio base station, RBS, according to an embodiment of the invention.

An embodiment of the invention provides a radio base station, RBS, 250 as illustrated in FIG. 7. The RBS comprises a remote radio unit, RRU, 252 a baseband unit, BBU, 254, a first optical fibre link 256 and a second optical fibre link 258.

The RRU 252 comprises a first single-λ optical transceiver 150, as described above with reference to FIG. 5. The BBU 254 comprises a second single-λ optical transceiver 150, as described above with reference to FIG. 5. It will be understood that a single-λ optical transceiver 160, as described above with reference to FIG. 6, may alternatively be used.

The first single-λ optical transceiver 150 is operable to generate an optical channel at a first wavelength, λk, and the second single-λ optical transceiver 150 is operable to generate an optical channel at a second wavelength, λl, different to the first wavelength.

The first and second optical fibre links 256, 258 are coupled between the RRU and the BBU. The first optical fibre link 256 forms a working mode, WM, link and the second optical fibre link 258 forms a protection mode, PM, link.

The single-λ transceiver 150 has built-in switching functionality and can therefore support two bi-directional wavelengths over one of the two redundant fibre links, either the WM link or the PM link. The single-λ transceiver 150 therefore supports deployment of link protection mechanisms in point-to-point connected two host systems, such as the RBS 250, used in legacy 2G/3G/4G networks.

Figure 8:
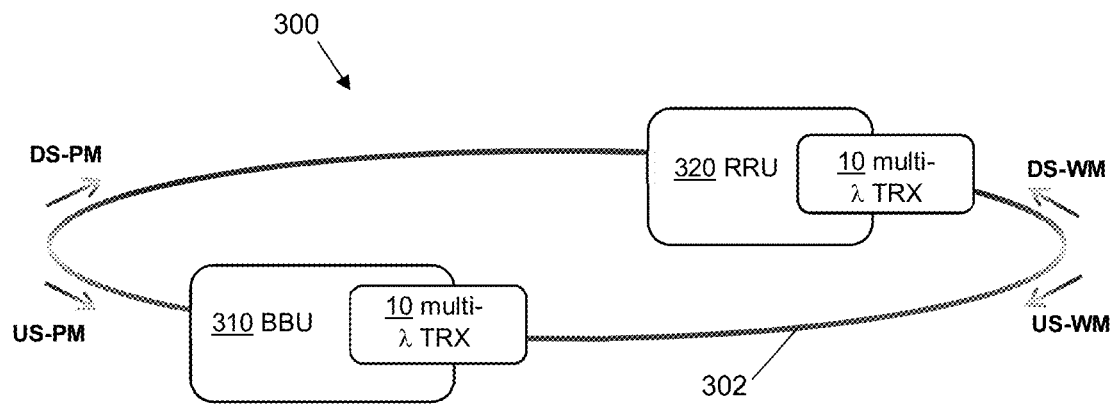
FIG. 8 illustrates an optical communications network according to an embodiment of the invention.

An embodiment of the invention provides an optical communications network 300, as illustrated in FIG. 8. The network 300 comprises a bi-directional wavelength division multiplexing, WDM, ring 302 interconnecting a plurality of first RBS nodes 310, 320 according to the previous embodiment. At least one of the first RBS nodes is a baseband unit, BBU, 310 and at least one other of the first RBS nodes is a remote radio unit, RRU 320.

The WDM ring consists of optical fibre 302 in a ring configuration that fully interconnects the RBS nodes 310, 320 via the multi-wavelength transceivers, TRX, 10. The bi-directional WDM ring has a working mode, WM, in which downstream, DS, channels are transmitted in a counter-clockwise direction and upstream, US, channels are transmitted in a clockwise direction, and a protection mode, PM, in which downstream, DS, channels are transmitted in the clockwise direction and upstream, US, channels are transmitted in the counter-clockwise direction.

Figure 9:
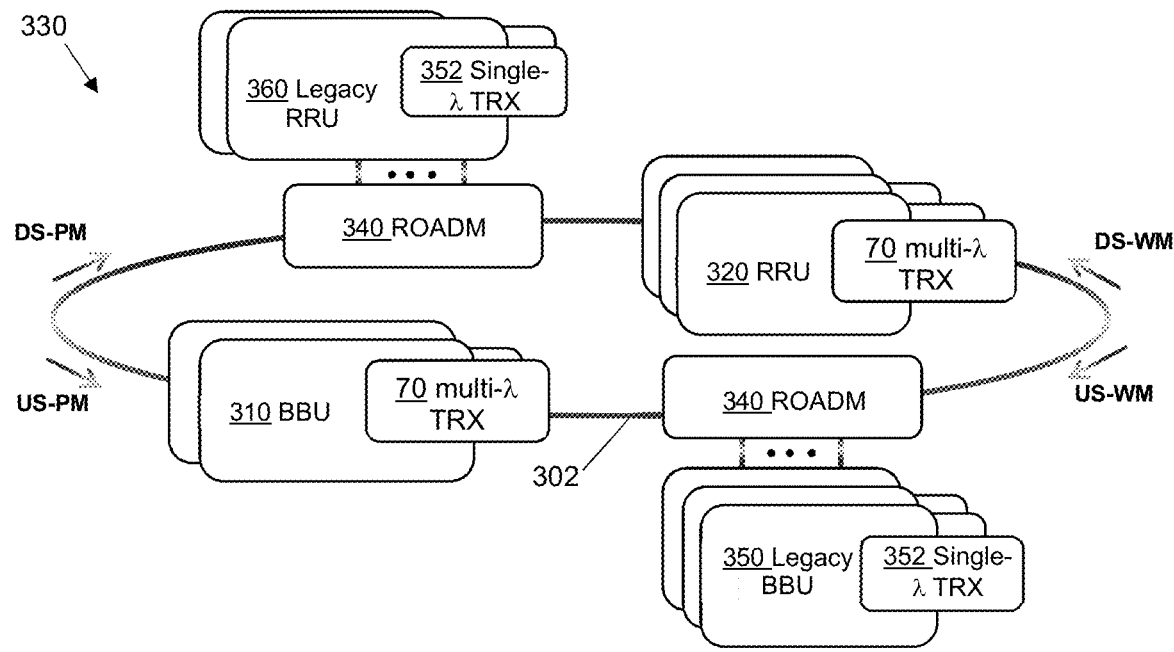
FIG. 9 illustrates an optical communications network according to an embodiment of the invention.

An embodiment of the invention provides an optical communications network 330, as illustrated in FIG. 9. The network 330 is similar to the network 300 of the previous embodiment, with the addition of a plurality of second RBS nodes 350, 360 and a plurality of reconfigurable optical add drop multiplexers, ROADMs, 340.

The second RBS nodes 350 are legacy RBS nodes, each comprising a single-wavelength optical transceiver, single- λDWDM TRX, 352. At least one of the second RBS nodes is a baseband unit, BBU, 350 and at least one other of the second RBS nodes is a remote radio unit, RRU 360.

Each legacy BBU 350 and each legacy RRU 360 is connected to the WDM ring 302 via a respective ROADM 340. That is to say, unlike the BBU 310 and the RRU 320 having the multi-wavelength TRX 10, there is no embedded ROADM in the legacy RBS nodes.

In an embodiment, the optical communications network 330 is an RBS site and the WDM-ring 302 is a DWDM-ring. For simplicity, FIG. 9 shows only a single RBS site being deployed over the bi-directional DWDM-Ring with simplex design for the transport of both CPRI and OAM data streams. It will be understood that network 330 can be scaled up from a single RBS site to a plurality of RBS sites, to form an entire fronthaul optical network of a radio access network, RAN.

The first RBS nodes 310, 320 are 5G RBS nodes and the second RBS nodes 350, 360 are either 2G, 3G or 4G nodes.

The fibre infrastructure used by DWDM-Ring follows the classic simplex design using a single SMF to carry bi-directional traffic for both upstream, US, and downstream, DS, traffic. The use of such an infrastructure implies that, to avoid data collision, the wavelengths selected to carry both the upstream channels and the downstream channels shall be different. For example, one may use the odd numbers of wavelengths for the upstream channels and the even numbers of wavelengths for the downstream channels respectively to schedule the channel plan with the wavelengths belonging to the desired DWDM bands, such as the C-band or L-band.

The RBS site 330 comprises 4 interconnected sub-sites 310, 320, 350, 360. The nodes belonging to two of the four sub-sites are equipped with a multi-λ TRX 70, as described above. These are the 5G-Radios and the multi-λ TRX enabled BBUs 310. Two external ROADMs 340 are used to support access to the DWDM-Ring for the other two sub-sites, one of which comprises legacy BBU-clusters 350 that communicate with the 5G-Radios and the other sub-site comprises legacy Radios 360 that are remote link partners of multi-λ TRX enabled BBUs. The external ROADMs may be a mini-ROADM as described in WO2015/176764. Following convention, the transport directions for the upstream and the downstream data are defined from the sub-sites of Radios to the sub-sites of BBUs. For the convenience of discussion, the traffic flows along the clockwise and anti-clockwise directions in the bi-directional DWDM-Ring are specified as the working mode for the upstream and the downstream data respectively. It is understood that, in the protection mode, for example if an SMF in the DWDM-Ring is broken, the traffic flows for the upstream and the downstream data will simultaneously be redirected to the opposite directions inside the DWDM-Ring.

For the 5G-Radio sub-site, each individual 5G-Radio 320 is equipped with the multi-λ TRX 70. Via the embedded ROADM on the multi-λ TRX, the 5G-Radios can be inter-connected with each other in a cascaded-chain over the DWDM-Ring. Following the convention in radio design, an "in-band" remote OAM system may be implemented for each individual 5G-Radio. "Remote" here refers to the fact that the OAM system implemented in the 5G-Radio 320 is a "slave" system that can be remotely controlled by a "master" OAM system implemented in the related BBU-cluster and/or a core network, and the "in-band" refers to the transport protocols used by remote OAM implemented on a data link layer and/or a network transport layer, which is carried by CPRI data streams. With such an approach, there is no need to assign dedicated wavelengths to carry the OAM signals over the DWDM-Ring.

The sub-site with legacy BBU-clusters 350 comprises an external ROADM 340 that is used to add or drop desired channels from the BBU-clusters. An "out-band" remote OAM system may be implemented on the ROADM. Again, this OAM system is "slave" and its configurations/operations are remotely carried by the OAM system of BBU-clusters and/or the core network. The "out-band" refers to the fact that the transport protocols used by the remote OAM are not carried by the channels to transport the CPRI data streams. To be able add and drop OAM signals to/from both host systems of ROADM and BBU-cluster, a specific fibre link may be allocated to transport the OAM signals between the host system of ROADM, ROADM node, and the host system of BBU-cluster, RBS node. Besides the functions for channel add and drop, the ROADM can also perform channels bypass and/or redirect traffic on either direction over the DWDM-Ring.

A number of BBUs 350 that support the LTE standard, i.e. 4G, may be used to construct the legacy BBU-clusters. The BBUs belonging to such a cluster are configured for communication with each other as a single multi-task master, which can share their baseband resources for data processing, and bridge the 5G-Radios to the core network so that various types of services can be delivered to UEs by the CN. Both "in-band" and "out-band" OAM systems are implemented for the BBU-cluster 350 to remotely manage the OAM operations on both the 5G-Radios 320 and the external ROADM 340.

The sub-site with legacy Radios 360 also comprises an external ROADM 340 similar to that used by the sub-site with BBU-clusters. Here, the ROADM is used to add or drop desired channels from the legacy Radios, and bridges data transport between legacy Radios 360 and multi-λ TRX enabled BBUs 310. This ROADM is also equipped with "out-band" OAM. Because the OAM signals have to be carried over the DWDM-Ring, a dedicated OAM channel, for example an express channel on the ROADM, with two specific wavelengths, may be allocated to bi-directionally transport OAM signals between ROADM node 340 and the host system of the multi-λ TRX enabled BBU-cluster 310. The legacy Radios sub-site may comprise different types of legacy radios used by the 2G/3G/4G networks. For each individual legacy radio, a DWDM-enabled single-λ TRX 352, for example a photonically enabled DWDM SFP+ module, may be implemented to communicate on a respective channel belonging to the multi-λ TRX of a respective multi-λ TRX enabled BBU 310.

For the sub-site with the multi-λ TRX enabled BBUs 310, legacy point-to-multipoint break-out CPRI transport configuration between a single BBU and a number of legacy RRUs can be recovered, and the BBU 310 can be directly connected to the DWDM-Ring 302 without involving any legacy DWDM access devices, such as transponders and arrayed waveguide gratings, AWGs. Compared to legacy transceivers, such as standard SFP+ modules, there are many advantages in the use of the multi-λDWDM TRX, such as a reduction of manufacturing cost and energy consumption, reduction of front-panel space occupied by a number of SFP+, and simplified mechanical design to fulfil the requirements of electromagnetic compatibility.

Following the legacy design of BBUs, an "in-band" OAM handling system is also implemented for each individual multi-λ TRX enabled BBU 310 to remotely manage OAM operations on related legacy 2G/3G/4G Radios. For remotely handling "out-band" OAM operations on the ROADM, a dedicated OAM remote system may also be implemented, which may use the express channels dedicated for OAM handing for the ROADM node 340.

Since all nodes being used to construct the cascaded link chain over the DWDM-Ring are the type of ordinary ROADMs or the nodes with the embedded ROADM, the process for link protection can be implemented. It means that, if the SMF between two adjacent nodes or the SMF for the transport links between two sub-sites is broken, the loss of bi-directional traffic for both the upstream and the downstream data running with the working modes inside the DWDM-ring can be recovered by redirecting the bi-directional traffic to run the protection mode over the DWDM-Ring. Such a link redundancy mechanism ensures the safe and robust transport of both upstream and downstream traffic among the nodes and/or the sub-sites over the DWDM-Ring.

Each multi-$\lambda$ TRX 70 is equipped with multi-$\lambda$DWDM transmitters TXi($\lambda$k) 80 and multi-$\lambda$ receivers RXj($\lambda$l) 110. Each single-$\lambda$ TRX 352 is equipped with single-$\lambda$DWDM transmitter, TXj($\lambda$l), and a single-$\lambda$ receiver RXj($\lambda$l). The indexes; i=1, 2, . . . , M and j=1, 2, . . . , N; are optical channel marks, which may be statically assigned to all transmitters and all receivers belonging to both the multi-$\lambda$ TRXs 70 and the single-$\lambda$ TRXs 352, and the indexes; k=1, 2, . . . , m, l=1, 2, . . . , n and k$\neq$l; are the wavelength marks. The summation of "m+n" is the total number of wavelengths planned for the DWDM-Ring 302. The total number of channels "M+N" may be equal to the total number of wavelengths "m+n" for the channel planning.

For the transmitter channels, TXi($\lambda$k) and TXj($\lambda$l), the wavelengths $\lambda$k and $\lambda$l may be statically assigned to both the multi-$\lambda$ TRXs 70 and the single-$\lambda$DWDM TRXs 352 according to a pre-defined channel-plan. For the receiver channels, RXi($\lambda$k) and RXj($\lambda$l), any of wavelengths $\lambda$k and $\lambda$l may be dynamically assigned to any of desired channels during channel-drop operations carried by the embedded ROADMs of the multi-$\lambda$ TRXs 70 and/or the standalone ROADMs 340 connecting the single-$\lambda$DWDM TRXs 352.

The TXi($\lambda$k) are configured for adding DWDM channels belonging to the multi-$\lambda$ TRX into the DWDM-Ring and further transported to the DWDM receivers RXi($\lambda$k) belonging to the single-$\lambda$DWDM TRXs.

The optical receivers, RXj($\lambda$l), 110 of the multi-$\lambda$DWDM TRX 100 support dropping of DWDM channels from the DWDM-Ring 302, which are transmitted by the optical transmitters, TXj($\lambda$l), of the single-$\lambda$DWDM TRXs 352. The optical receivers, RXj($\lambda$l), 110 of the multi-$\lambda$DWDM TRX 100 also support bypassing DWDM channels that are not to be dropped to the multi-$\lambda$DWDM TRX 100 and returning them back into the DWDM-Ring. Generally speaking, the optical receivers, RXj($\lambda$l), 110 of the multi-$\lambda$DWDM TRX 100 may have the same amount of channel numbers as the optical transmitters, TXi($\lambda$k), 80.

Each optical receiver, RXj($\lambda$l), comprises a receiver photodiode, RX-PD, and is coupled to a reconfigurable optical channel-drop apparatus, which in this embodiment is a 2-directional reconfigurable optical channel-drop multiplexer ROCDM, 2D-ROCDM. The 2D-ROCDM comprises: an OPC; and two forming the first ('West') drop path 114 and the second ('East') drop path 118, including two variable optical attenuators, RX-VOA, 116, 120 for receiver power regulation; a drop micro-ring resonator 130, MRR ($\lambda$l). The RX-PDs may be wideband devices that can cover an entire wavelength band, for example the C-band, so that the RX-PDs can support the selective drop of any desired wavelengths transmitted by the transmitters, TXj($\lambda$l), in the single-$\lambda$DWDM TRXs 352 to any desired receiver channel, RXj($\lambda$l), multi-$\lambda$DWDM TRX 100 via the 2D-ROCDM 112.

Each ADM port 72, 74 is coupled to the respective FWCs via two SMFs. Each ADM port comprises a 3-way optical circulator which splits incoming traffic and/or combines outgoing traffic. Due the nature of circulator design, it can also reject any backward propagating signals to avoid recycling of dropped channels back out of the optical transceiver 100 into the DWDM-ring 302.

The centre wavelengths of optical transmitters may be selected according to a proprietary channel-plan and/or the standardized DWDM channel-plan specified by standardization bodies, for example ITU-T G.694.1 06/2002, which belongs to one of the SMF transmission windows, e.g. C-band or L-band, etc. It is understood that the channel-plan will be determined by the total wavelengths "m+n" specified to both the TXi($\lambda$k) of the multi-$\lambda$DWDM TRXs 100 and the TXj($\lambda$j) of the single-$\lambda$DWDM TRXs 352, with a well-specified channel-spacing, e.g. 100 GHz, 50 GHz, 25 GHz etc.

During the normal operation of the multi-$\lambda$DWDM TRX 100, outgoing optical channels may only be guided either on the WEST ADM Port or the EAST ADM Port. This means that both upstream and downstream traffic shall always be transported in the opposite direction over the DWDM-Ring 302. For example, if the system decides to add channels onto the WEST ADM port, the maximum attenuation will be set by the right TX-VOA 92 on the "East" add path 90 to completely terminate the beam onto the EAST ADM port 74. Similarly, if the system decides to add channels onto the EAST ADM Port, the maximum attenuation will be set by the left TX-VOA 88 on the "WEST" add path 86, to completely terminate the beam onto the WEST ADM port. In order to effectively terminate unwanted channels into the DWDM-Ring, the TX-VOA is used as the outgoing beam terminators for the multi-$\lambda$DWDM TRX 100.

Figure 10:
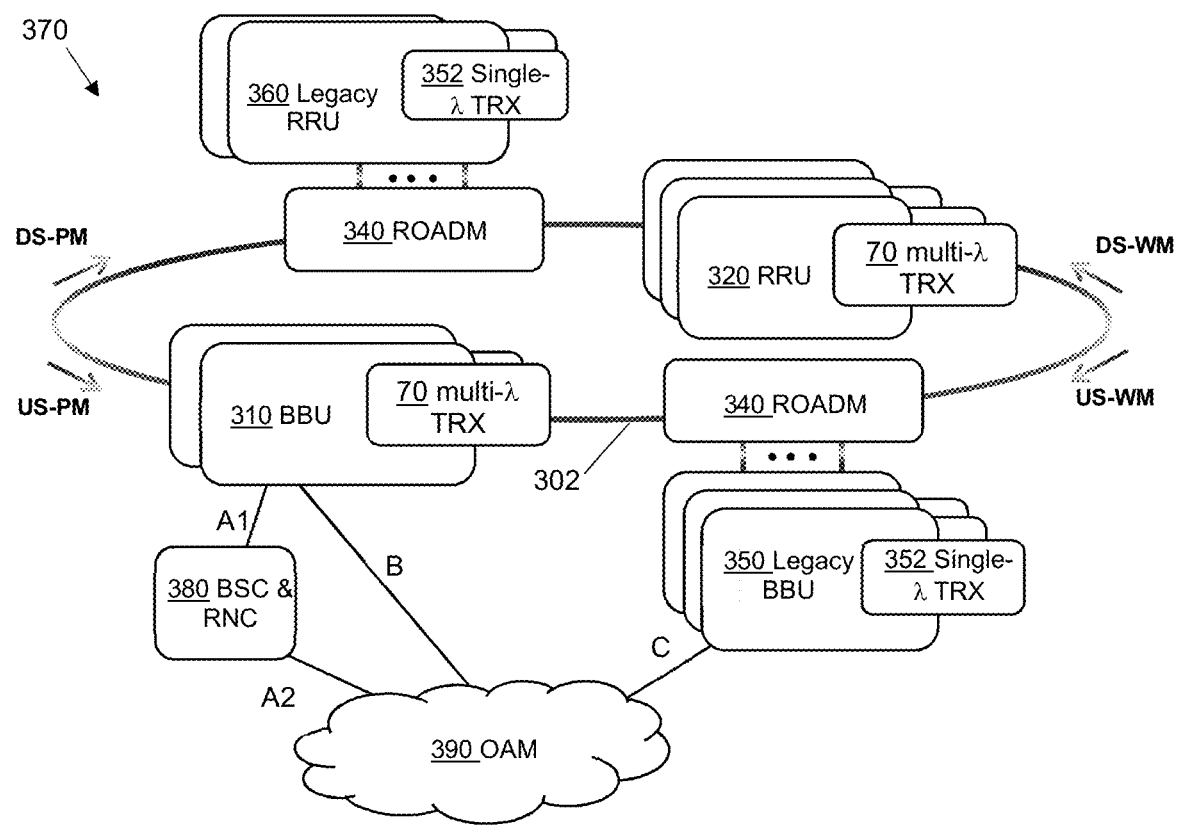
FIG. 10 illustrates an optical communications network according to an embodiment of the invention.

Another embodiment of the invention provides an optical communications network 370, as illustrated in FIG. 10. The network 370 is similar to the network 330 of the previous embodiment, with the addition of a network controller 380 and an OAM system in the core network 390.

The network controller comprises a base station controller, BSC, and a radio network controller, RNC, configured to obtain a reference optical power for the communications network 370.

The optical attenuator control apparatus, TX-VOA Ctrl, 52 in the BBU nodes 310 are configured to receive a third control signal comprising an indication of the reference optical power.

The network controller 380 is configured to: obtain a transmission loss for each optical channel of each of the RBS nodes 310, 320, 350, 360; identify the optical channel having the maximum transmission loss; and set the reference optical power equal to an optical power of the optical channel having the maximum transmission loss.

In an embodiment, both the sub-site with the legacy BBU-clusters 350 and the sub-site with multi-$\lambda$ TRX enabled BBUs 310 are further connected to a backhaul transport network and the core network 390 through different link paths, depending on the types of mobile networks in use. For 2G and 3G mobile networks, two cascaded link paths, A1 and A2, may be used to interconnect the multi-$\lambda$ TRX enabled BBUs 310, BSC/RNC 380 and the core network. For 4G and 5G mobile networks, two sub-sites may be directly connected to the backhaul transport network and the core network via link paths B or C, respectively. It is understood that UEs can be attached and/or have handover between legacy BBU-clusters and/or the multi-λ TRX enabled BBUs 310 through air interfaces of antennas (not shown) that are either directly integrated in or are external devices connected to both the 5G-Radios 320 and legacy Radios 360.

In an embodiment, the network controller 380 is configured to implement the method 400, 410 of controlling optical powers of optical channels in an optical communications network according to any of the embodiments described below.

Figure 11:
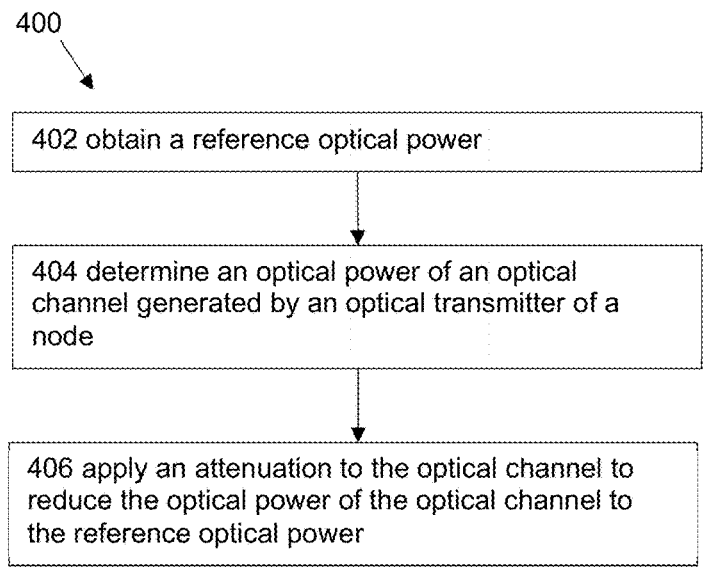
FIG. 11 illustrates steps of a method according to an embodiment of the invention of controlling optical powers of optical channels in an optical communications network comprising a plurality of nodes.

Referring to FIG. 11, an embodiment of the invention provides a method 400 of controlling optical powers of optical channels in an optical communications network comprising a plurality of nodes, such as the RBS 250 and the optical communications networks 300, 330, 370 described above with reference to FIGS. 7 to 10.

The method comprises obtaining 402 a reference optical power; determining 404 an optical power of an optical channel generated by an optical transmitter of a node; and applying 406 an attenuation to the optical channel to reduce the optical power of the optical channel to the reference optical power.

Figure 12:
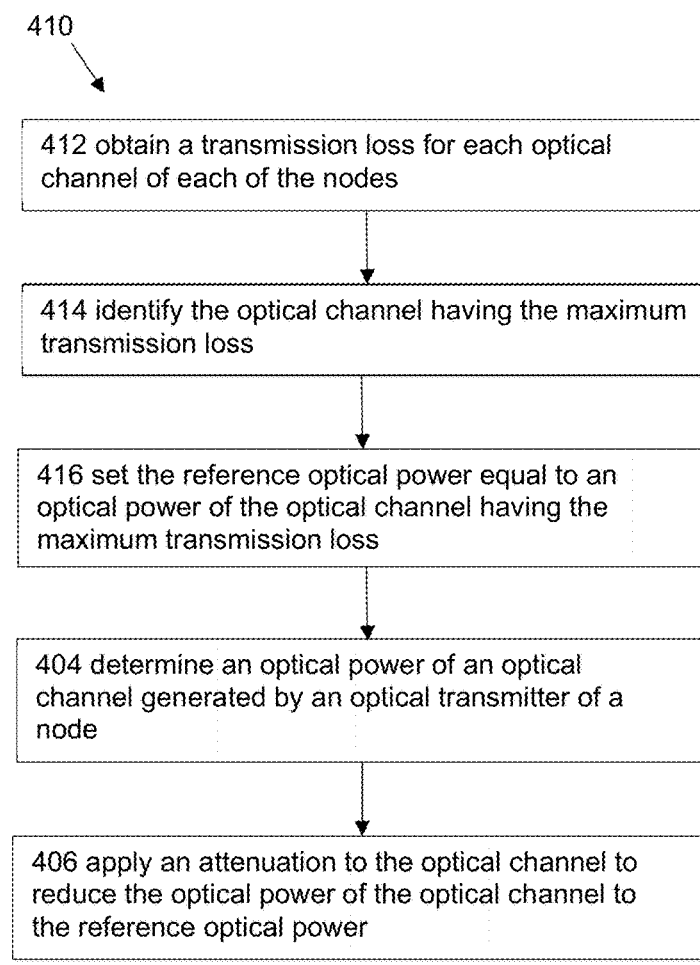
FIG. 12 illustrates steps of a method according to an embodiment of the invention of controlling optical powers of optical channels in an optical communications network comprising a plurality of nodes.

In a method 410 according to another embodiment, illustrated in FIG. 12, the reference optical power is obtained by: obtaining 412 a transmission loss for each optical channel of each of the nodes; identifying 414 the optical channel having the maximum transmission loss; and setting 416 the reference optical power equal to an optical power of the optical channel having the maximum transmission loss.

Figure 13:
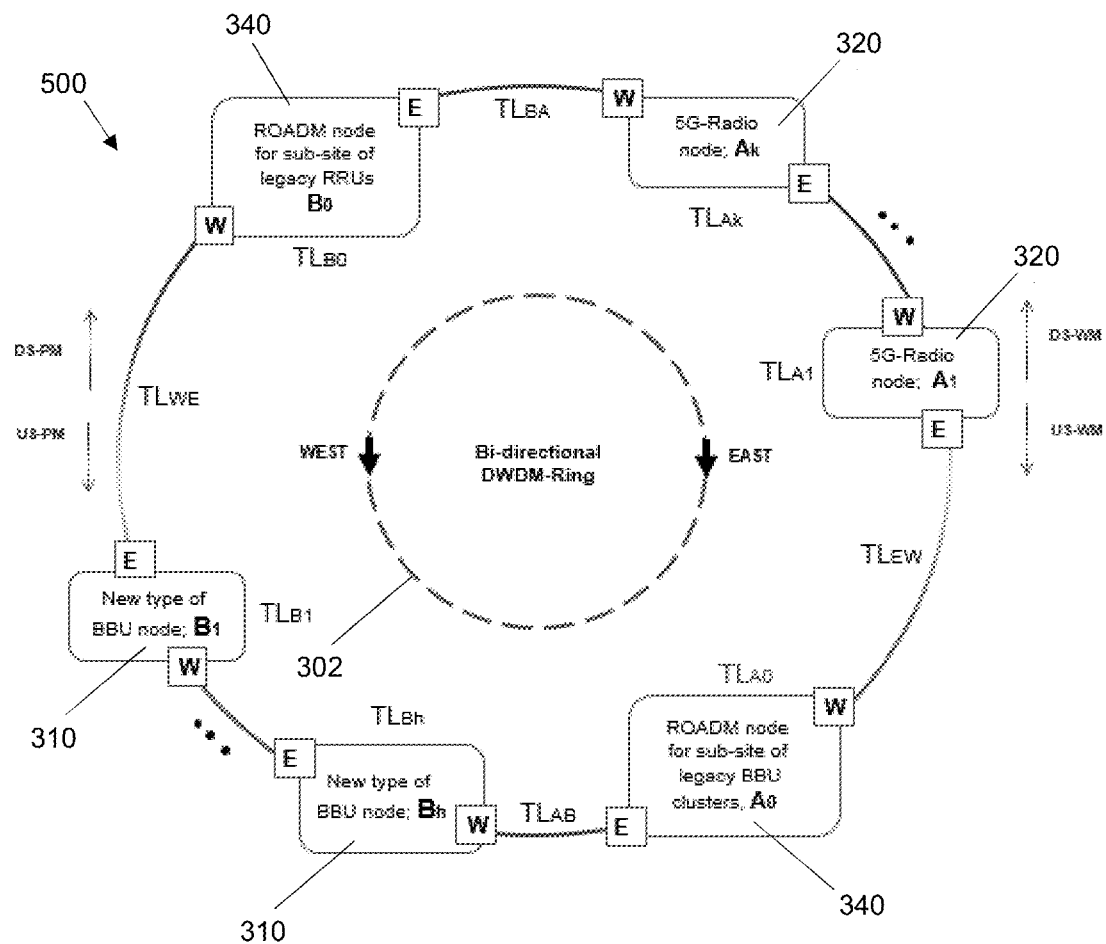
FIG. 13 illustrates an optical communications network comprising a plurality of nodes.

A further embodiment of the invention provides a method of controlling optical powers of optical channels in an optical communications network 500 comprising a plurality of nodes 310, 320, 340, as illustrated in FIG. 13. The method of this embodiment is similar to the methods 400, 410 of the previous embodiments.

During the propagation of optical signals inside the DWDM-Ring 302, the transmission losses, TL, for each individual channel belonging to a specific node 310, 320, 340 may increase with an increasing number of bypassed nodes and the length of fibres used for node interconnection. After reaching the respective receiver, the total transmission loss for each individual channel may also be significantly different if the optical channel is propagated through the DWDM-ring cascaded node-chain along the EAST link path (i.e. the clockwise link path) or along the WEST link path (i.e. the anticlockwise link path), as illustrated in FIG. 13.

Considering, for example, communication between ROADM node A0 340, connecting to a sub-site of legacy BBUs and 5G Radio nodes A1, A2, . . . , Ak, 320. In this example, let's assume that the corresponding TL for the bypass of these nodes are $TL_{A0}$, $TL_{A1}$, $TL_{A2}$, . . . , $TL_{Ak}$ respectively, and that the TL due to the length of the fibres between the four sub-sites are $TL_{EW}$, $TL_{WE}$, $TL_{AB}$ and $TL_{BA}$ respectively; we assume the loss inside a sub-site is negligible. Then, we observe that the nodes/channels belonging to A1 and Ak may have the lowest and highest TL if the direction of propagation is along the EAST link path, i.e. the propagation direction for upstream traffic in the working mode, and the total transmission loss for the channels belonging to node A1, $TLtotal_{(A1)}$, may be estimated by $$Ltotal_{(A1)} = TL_{EW}$$

while the total loss for the channels belonging to node Ak TLtotal(Ak) may be estimated by $$TLtotal(Ak) = TL_{EW} + TL_{A1} + TL_{A2} + \ldots + TL_{Ak-1}.$$

If the propagated direction is changed to be along the WEST link path, the total loss for the nodes A1 and Ak will be significantly different, and may be estimated by:

$$TL_{total(A1)} = TL_{BA} + TL_{WE} + TL_{AB} + TL_{A2} + TL_{A3} +, \ldots, + TL_{Ak} + TL_{B0} + TL_{B1} + TL_{B2} \ldots, + TL_{Bh}$$

$$TL_{total(Ak)} = TL_{BA} + TL_{WE} + TL_{AB} + TL_{B0} + TL_{B1} + TL_{B2} \ldots, + TL_{Bh}$$

Since the TL for the bypassed nodes and the fibre length for node interconnection will be approximately constant, the values of TL may be calibrated during manufacturing and saved as factory inventory data in memory devices belonging to the nodes. In order to achieve initial equalization of optical power for all channels during their propagation over the DWDM-Ring, a simple "static power-balance method" may be used, which includes the determination of a reference optical power for all channels and the adjustment of the optical power using TX-VOA for each individual channels according to the reference. Since the TX-VOAs can only turn down the outgoing optical power, the channel with maximum TL may be selected as a reference channel to set the reference optical power.

The process for TX power regulation may only be applied to the multi-λ TRX, which implies that power regulation is not necessary for downstream data over the DWDM-Ring in both the normal working mode and the protecting mode. This is because the TL due to bypassed nodes, the length of fibre and the direction for beam propagation will be the same for all single-λ TRX, in, for example, the nodes 350 belonging to the sub-site with legacy BBU-clusters and the sub-site 360 with legacy Radios.

It is understood that the method optical power regulation may only be applied for compensating static loss sources, e.g. adding and removing nodes in the link paths of the DWDM-Ring. The method may not be applied to compensate TL for losses caused by dynamic loss sources, such as micro-bending induced losses on SMF due to significant changes of environment, e.g. high temperature difference in summer and winter seasons. As the length of operating time increases, the optical power for each individual transceiver may be dynamically changed mainly due to performance degradation of components belonging to the transceiver, e.g. the lasers. Real-time monitoring and dynamic changes to optical power for all channels and also real-time power regulation to rebalance the optical power for all channels may therefore be required.

The method of controlling optical powers of optical channels according to this embodiment, which may be considered as a "power down-tuning method", may be used for "real-time" power regulation of all channels being propagated over the DWDM-Ring, which relies on the real-time measurement of optical power received by remote link partners, i.e. the receivers RXi(λk) of the single-λDWDM TRX. The information of the optical power detected by the receivers RXi(λk) can be extracted from standardized "diagnostic monitoring interface (DMI)" of the single-λ TRX, as specified by SFP MSA, SFF-8472, The Diagnostic Monitoring Interface for Optical Transceivers, Rev 12.2 Nov. 21, 2014. DMI refers to the real-time diagnostic information stored in the memory of single-λ TRX, which may include: real-time sensors, such as measurements of laser bias current, TX outgoing power, RX incoming power, module temperature and supply voltages; control flags, such as TX disable, Rate select; status flags, such as TX fault, RX loss; warning flags and alarm flags to indicate threshold being reached by the real-time sensors; and customer writable fields for dedicated/special applications.

With the method of this embodiment, the DMI information can be extracted by a host system of a single-λ transceiver via its two-wire serial interface or management data input & output bus. The DMI information can be remotely extracted and/or fetched using a remote OAM handling system. The DMI information can be used to instruct a host system of the multi-λ TRX to perform fine tuning of optical power with the TX-VOAs. In such a way, the dynamic power regulation for the multi-λ TRX can be achieved.

Figure 14:
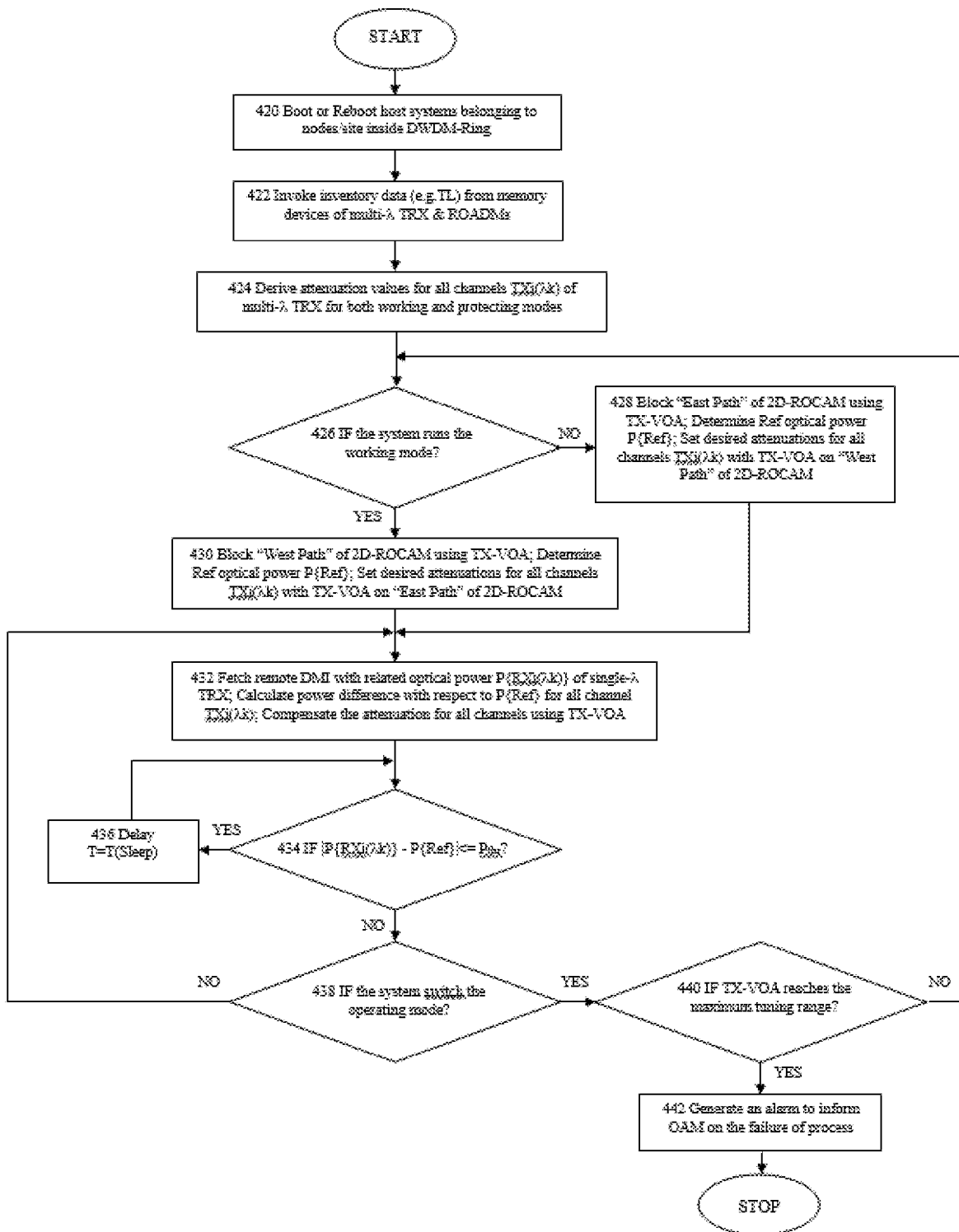
FIG. 14 illustrates steps of a method according to an embodiment of the invention of controlling optical powers of optical channels in the optical communications network of FIG. 13.

FIG. 14 illustrates a method according to a further embodiment of controlling optical powers of optical channels in the optical communications network 500.

In this embodiment, both "static" and "dynamic" power regulation can be implemented for upstream data over the DWDM-Ring 302. The process starts 420 with the boot and/or reboot of host systems, i.e. the ROADMs and nodes equipped with multi-λ TRX 70. In the next step, the process invokes 422 inventory data stored in the memory devices 100 of the multi-λ TRX and/or the ROADMs 340. With the inventory data, an attenuation may be calculated 424 for each transmitter channel TXi(λk) 80.

If the network 500 is configured to run the working mode 426, i.e. the upstream data is propagated along the "EAST link path", the method comprises setting 430 a maximum value of attenuation on the TX-VOA 88 in the West Path 86 of the 2D-ROCAM 84. A reference optical power P{Ref} is then determined, by comparison of total TL for all nodes/sites deployed inside the DWDM-Ring, and determining the node having the maximum TL as the reference. With the reference power, an estimated attenuation is set for the rest of nodes to equalize the optical power for all channels, using the TX-VOA 92 in the "East Path" 90 of the 2D-ROCAM 84.

If the network is switched from the working mode to the protection mode, i.e. the beam propagation is through the "WEST link path", the method comprises setting 428 a maximum value of attenuation on the TX-VOA 92 in the East Path 90 of the 2D-ROCAM 84. The reference optical power P{Ref} is then redetermined by the comparison of total TL for all nodes/sites deployed inside the DWDM-Ring, determining the node having the maximum TL as the reference, and setting the estimated attenuations for the rest of nodes to equalize the optical power for all channels using the TX-VOA 88 in the "West Path" 86 of the 2D-ROCAM.

To dynamically regulate the optical power of the channels, the method comprises fetching 432 stored remote DMI information from the memory devices of the single-λDWDM TRX 352; the real-time measured reference optical power P{Ref} of the reference channel, i.e. the channel with the lowest optical power among all receiver channels RXi(λk), can be obtained. By comparing the attenuation difference between the reference channel and the rest of the optical channels, the method compensates any attenuation difference for each transmitter channel TXi(λk) of the multi-λ TRXs 70 using the respective TX-VOA.

The method further comprises checking 434 whether there is a significant change of optical power. This is done by subtracting the measured optical power of each individual channel P{RXi(λk)} from the reference optical power P{Ref}, and comparing the difference to a predefined threshold Pthr. If the power difference is less than Pthr, the method may go to a "standby" status with a "sleep time" T(sleep) 436, which may be varied as necessary. The power comparison will be executed again if T=T(sleep) is exceed.

If |P{RXi(λk)}−P{Ref}|<=Pthr is not satisfied, the method comprises checking whether this is due to a change of operating mode 438, changing the working mode to/from the protection mode. If it is not, the method will only perform "dynamic" power regulation to balance the optical power for all channels. Otherwise, the method will start over again and perform both "static" and "dynamic" power regulation. Before invoking "static" and "dynamic" power regulation, the method will first check 440 if the TX-VOA 88, 92 of the multi-λ TRXs 70 have reached the maximum tuning range. If the maximum tuning range is not reached, the "static" and "dynamic" power regulation will be executed. If one of the TX-VOAs is beyond its tuning limit, the method will generate 442 an alarm signal to indicate a failure of power regulation to the OAM handling system, and will terminate.

Figure 15:
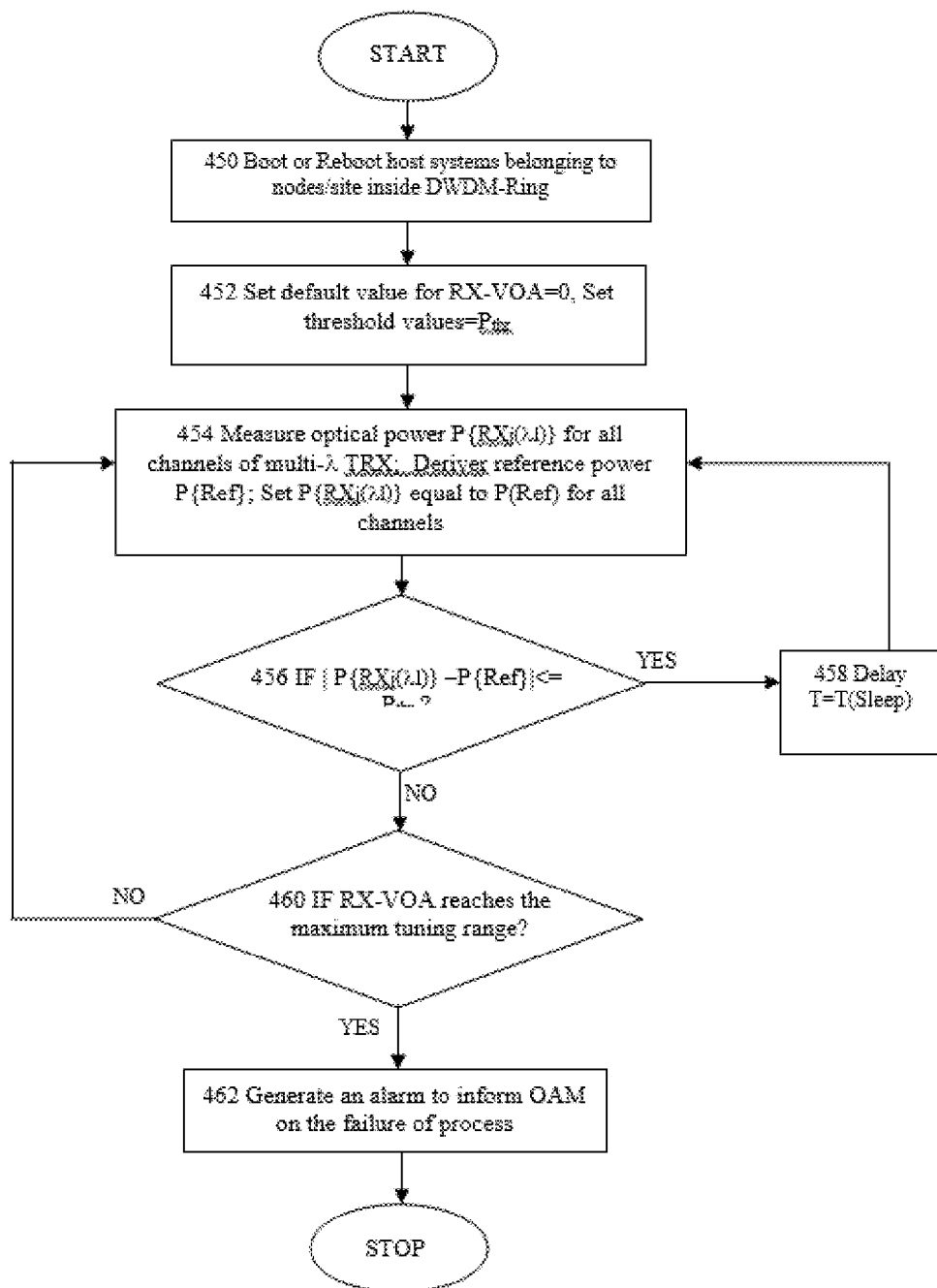
FIG. 15 illustrates steps of a method according to an embodiment of the invention of controlling optical powers of optical channels in the optical communications network of FIG. 13.

Referring to FIG. 15, a further embodiment provides method of controlling optical powers of optical channels in the optical communications network 500 in which optical power control is also performed at the receivers of the multi-λ TRX enabled BBUs 310.

In this embodiment, "power down-tuning" is also used for "real-time" power regulation on the local RX-PDs of the multi-λ TRX 70, which relies on real-time measurement of the optical power for all receivers RXj(λl) 110. The method comprises extracting and comparing measured values of optical power at the RX-PDs, to identify and specify the reference channel, i.e. the channel that has the lowest optical power. The RX-VOAs 116, 120 are then configured to adjust the optical power on the rest of channels until they reach the same level of optical power as the reference channel. In this way, the optical power deposited on the RX-PDs may be dynamically balanced.

This method of "RX power down-tuning" may be implemented using the RX-VOA and RX-VOA Ctrl. After booting or rebooting of systems and/or nodes equipped with multi-λ TRX 70, the method comprises specifying default values, including setting minimum attenuation values for RX-VOA, and defining a threshold value optical power, Pthr. The method the performs real-time measurements of optical power for each individual channel, determines the reference channel having the lowest optical power at the respective RX-PD, and takes the value of the lowest optical power as the reference optical power, P(Ref). The P(Ref) is then applied to the rest of the channels by configuring the RX-VOAs to have appropriate attenuations. This is done by subtracting the measured optical power for each individual channel P{RXj(λk)} from the reference optical power P{Ref}, and compared the difference to the predefined threshold Pthr. If the difference is less than Pthr, the method enters a "standby" status with a "sleep time" T(sleep), which may be varied as necessary. The method repeats the power comparison again if T=Ti(sleep) is exceed.

If the condition given in equation |P{RXj(λk)}−P(Ref)|<=Pthr is not satisfied, the method comprises checking if the RX-VOAs are beyond their tuning limit.

If the limit of the tuning range of the RX-VOA is not reached, the process will start over again by measuring the optical power for all channels, determining a new reference channel and setting the optical power for all channels to be the same as that of the reference channel. If an RX-VOA is out of its tuning range, the method comprises generating an alarm signal to inform the OAM system of the failure and the method will terminate.

The invention claimed is:

1. A method of controlling optical powers of optical channels in an optical communications network comprising a plurality of nodes, the method comprising:
   determining whether a measured optical power has satisfied a pre-determined threshold;

responsive to determining the measured optical power has satisfied the pre-determined threshold, determining whether the measured optical power is due to a change of an operating mode of the optical communications network;

responsive to determining the measured optical power is not due to a change of an operating mode of the optical communication network, determining whether a maximum tuning range of an optical attenuator has been reached;

responsive to determining the maximum tuning range has not been reached, obtaining a reference optical power;

determining an optical power of an optical channel generated by an optical transmitter of a node; and applying an attenuation to the optical channel to reduce the optical power of the optical channel to the reference optical power.

2. The method as claimed in claim 1, wherein the optical communications network is a fronthaul network of a radio access network, RAN, and the nodes are radio base station (RBS) nodes.

3. The method as claimed in claim 1, wherein the method is performed by a network controller operating in the optical communications network.

4. The method as claimed in claim 1, wherein determining the optical power of the optical channel comprises determining an optical power of an optical channel generated by a multi-wavelength optical transmitter of an RBS node.

5. The method as claimed in claim 1, wherein the plurality of nodes communicate via a dense wavelength division multiplexing (DWDM) ring.

6. The method as claimed in claim 1, wherein the optical communications network comprises a 5G radio network and one of a 2G, 3G, and 4G radio network.

7. A network controller configured to control optical powers of optical channels in an optical communications network comprising a plurality of nodes, the network controller comprising:

processing circuitry configured to perform operations comprising determining whether a measured optical power has satisfied a pre-determined threshold;

responsive to determining the measured optical power has satisfied the pre-determined threshold, determining whether the measured optical power is due to a change of an operating mode of the optical communications network;

responsive to determining the measured optical power is not due to a change of an operating mode of the optical communication network, determining whether a maximum tuning range of an optical attenuator has been reached;

responsive to determining the maximum tuning range has not been reached, obtaining a reference optical power, determining an optical power of an optical channel generated by an optical transmitter of a node, and applying an attenuation to the optical channel to reduce the optical power of the optical channel to the reference optical power.

8. The network controller as claimed in claim 7, wherein the optical communications network is a fronthaul network of a radio access network, RAN, and the nodes are radio base station (RBS) nodes.

9. The network controller as claimed in claim 7, wherein the processing circuitry is further configured to determine the optical power of the optical channel by determining an optical power of an optical channel generated by a multi-wavelength optical transmitter of an RBS node.

10. The network controller as claimed in claim 7, wherein the plurality of nodes are connected via a dense wavelength division multiplexing (DWDM) ring.

11. The network controller as claimed in claim 7, wherein the optical communications network comprises a 5G radio network and one of a 2G, 3G, and 4G radio network.

12. A computer program product comprised on a non-transitory computer readable medium, the computer program product comprising executable instructions that when executed by a processor of a network controller of a network controller configured to control optical powers of optical channels in an optical communications network comprising a plurality of nodes, causes the processor performs operations comprising:

determining whether a measured optical power has satisfied a pre-determined threshold;

responsive to determining the measured optical power has satisfied the pre-determined threshold, determining whether the measured optical power is due to a change of an operating mode of the optical communications network;

responsive to determining the measured optical power is not due to a change of an operating mode of the optical communication network, determining whether a maximum tuning range of an optical attenuator has been reached;

responsive to determining the maximum tuning range has not been reached, obtaining a reference optical power;

determining an optical power of an optical channel generated by an optical transmitter of a node; and applying an attenuation to the optical channel to reduce the optical power of the optical channel to the reference optical power.

13. The computer program product as claimed in claim 12, wherein the optical communications network is a fronthaul network of a radio access network, RAN, and the nodes are radio base station (RBS) nodes.

* * * * *